(12) United States Patent
Ito et al.

(10) Patent No.: US 12,731,346 B2
(45) Date of Patent: Sep. 8, 2026

(54) WEARABLE TERMINAL DEVICE, PROGRAM, AND NOTIFICATION METHOD IN MIXED REALITY

(71) Applicant: KYOCERA Corporation, Kyoto (JP)

(72) Inventors: Shingo Ito, Kyoto (JP); Tomokazu Adachi, Yokohama (JP); Kai Shimizu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 142 days.

(21) Appl. No.: 18/551,860

(22) PCT Filed: Mar. 29, 2021

(86) PCT No.: PCT/JP2021/013241

§ 371 (c)(1),
(2) Date: Sep. 21, 2023

(87) PCT Pub. No.: WO2022/208595

PCT Pub. Date: Oct. 6, 2022

(65) Prior Publication Data

US 2024/0177436 A1 May 30, 2024

(51) Int. Cl.

| | |
|---|---|
| ***G06T 19/00*** | (2011.01) |
| ***G02B 27/01*** | (2006.01) |
| ***G09B 5/06*** | (2006.01) |

(52) U.S. Cl.

CPC .......... *G06T 19/006* (2013.01); *G02B 27/017* (2013.01); *G09B 5/06* (2013.01); *G02B 2027/0138* (2013.01)

(58) Field of Classification Search

None
See application file for complete search history.

(56) References Cited

U.S. PATENT DOCUMENTS

| | | | |
|---|---|---|---|
| 6,023,275 | A | 2/2000 | Horvitz et al. |
| 9,129,430 | B2 | 9/2015 | Salter et al. |
| 9,501,873 | B2 | 11/2016 | Salter et al. |
| 9,547,406 | B1 | 1/2017 | Wheeler et al. |
| 9,715,332 | B1 | 7/2017 | Morris |
| 9,761,057 | B2 | 9/2017 | Salter et al. |
| 10,642,041 | B2 | 5/2020 | Han et al. |

(Continued)

FOREIGN PATENT DOCUMENTS

| | | | |
|---|---|---|---|
| JP | 2000-299851 | A | 10/2000 |
| JP | 2016-181751 | A | 10/2016 |

(Continued)

*Primary Examiner* — Zhengxi Liu
(74) *Attorney, Agent, or Firm* — Studebaker Brackett PLLC

(57) ABSTRACT

A wearable terminal device is configured to be used by being worn by a user. The wearable terminal device includes at least one processor. The at least one processor detects a visible area for the user inside a space and causes a display to display an instructional image located inside the visible area. When there is an instructional image located outside the visible area, the at least one processor issues a first notification making the user aware of the existence of the instructional image. As a result of this first notification being issued, the user of the wearable terminal device is able to notice the existence of the instructional image generated by an instruction given by a remote instructor.

16 Claims, 11 Drawing Sheets

(56) References Cited

U.S. PATENT DOCUMENTS

| | | | | |
|---|---|---|---|---|
| 10,983,681 | B1 | 4/2021 | Parker | |
| 11,474,679 | B2 | 10/2022 | Parker | |
| 11,562,540 | B2 | 1/2023 | Meier et al. | |
| 11,836,336 | B2 | 12/2023 | Parker | |
| 12,112,089 | B2 | 10/2024 | Osterhout et al. | |
| 12,288,305 | B2 | 4/2025 | Shimizu et al. | |
| 12,353,614 | B2 | 7/2025 | Ito et al. | |
| 2009/0138819 | A1 | 5/2009 | Yu | |
| 2010/0100842 | A1 | 4/2010 | Kim | |
| 2010/0238161 | A1 | 9/2010 | Varga et al. | |
| 2010/0328344 | A1 | 12/2010 | Mattila et al. | |
| 2012/0072869 | A1 | 3/2012 | Odagawa et al. | |
| 2013/0246967 | A1 | 9/2013 | Wheeler et al. | |
| 2014/0189515 | A1* | 7/2014 | Waldman | G06F 16/444 715/719 |
| 2014/0375683 | A1 | 12/2014 | Salter et al. | |
| 2015/0067591 | A1 | 3/2015 | Nancke-Krogh et al. | |
| 2015/0199081 | A1 | 7/2015 | Wheeler | |
| 2016/0011724 | A1 | 1/2016 | Wheeler et al. | |
| 2016/0269631 | A1* | 9/2016 | Jiang | G06T 3/4038 |
| 2017/0005969 | A1* | 1/2017 | Oshiba | H04L 51/046 |
| 2017/0115728 | A1* | 4/2017 | Park | G06T 19/006 |
| 2018/0315246 | A1 | 11/2018 | Fukazawa et al. | |
| 2019/0066630 | A1* | 2/2019 | Fukazawa | G09G 5/36 |
| 2019/0087021 | A1 | 3/2019 | Balan et al. | |
| 2019/0189159 | A1* | 6/2019 | Gan | G06F 16/252 |
| 2019/0340822 | A1 | 11/2019 | Ernst et al. | |
| 2021/0311616 | A1 | 10/2021 | Parker | |
| 2022/0076455 | A1* | 3/2022 | Tucker | G06K 7/1417 |
| 2022/0206677 | A1 | 6/2022 | Zadina et al. | |
| 2022/0326816 | A1 | 10/2022 | Walkin et al. | |
| 2022/0357845 | A1 | 11/2022 | Luo | |
| 2023/0027501 | A1 | 1/2023 | Parker | |
| 2024/0193511 | A1 | 6/2024 | Chakra et al. | |
| 2024/0201502 | A1 | 6/2024 | Ito et al. | |
| 2024/0281110 | A1 | 8/2024 | Chung et al. | |
| 2024/0288931 | A1 | 8/2024 | Ito et al. | |
| 2024/0303948 | A1 | 9/2024 | Shimizu et al. | |

FOREIGN PATENT DOCUMENTS

| | | | | |
|---|---|---|---|---|
| JP | 2019-519020 | A | 7/2019 | |
| JP | 2020-177338 | A | 10/2020 | |
| WO | WO-2014162825 | A1 * | 10/2014 | G06T 19/006 |
| WO | 2017/098822 | A1 | 6/2017 | |
| WO | 2017/184694 | A1 | 10/2017 | |
| WO | 2020/179027 | A1 | 9/2020 | |

* cited by examiner

FIG. 17

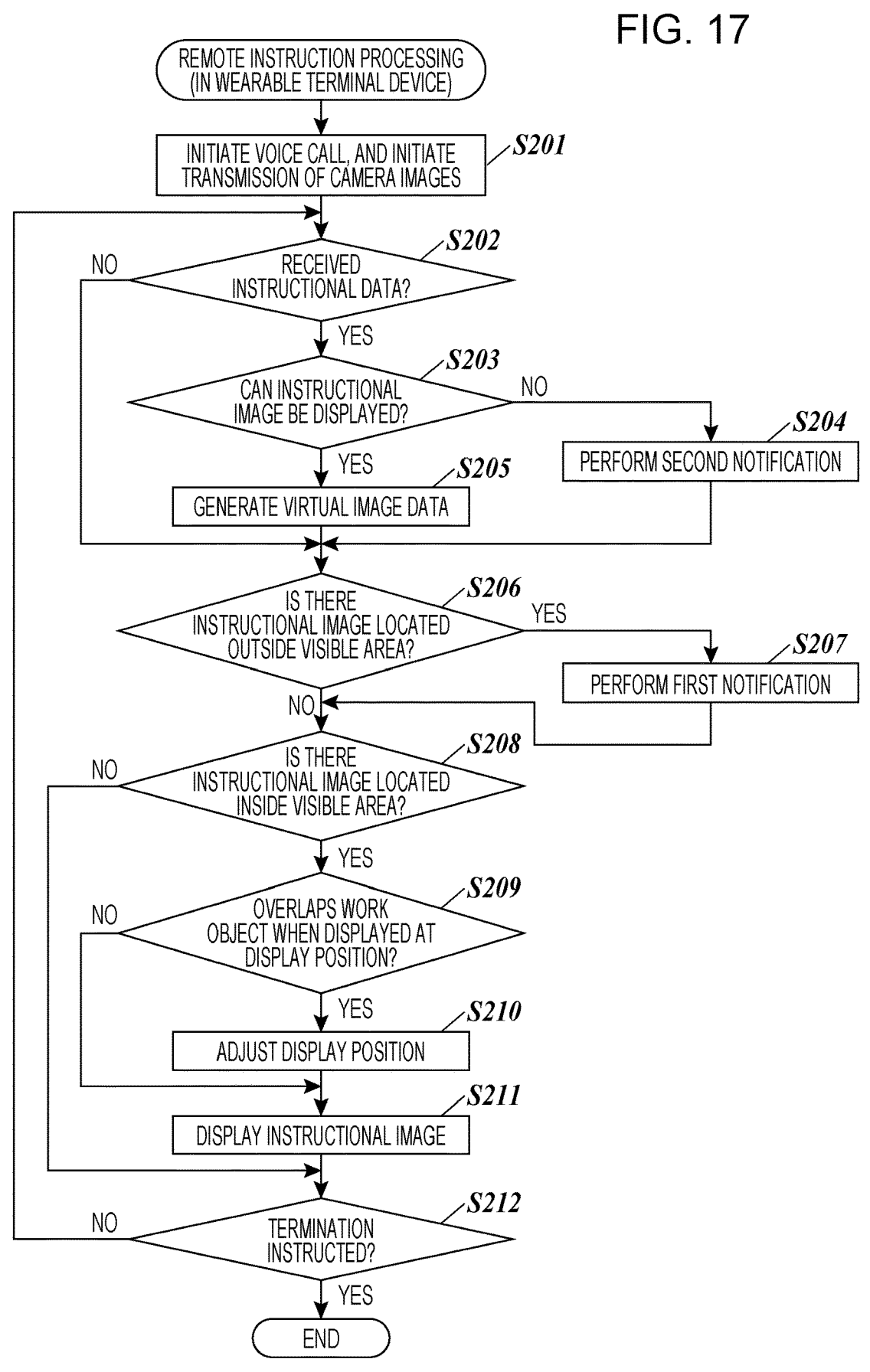

REMOTE INSTRUCTION PROCESSING (IN WEARABLE TERMINAL DEVICE)

S201 INITIATE VOICE CALL, AND INITIATE TRANSMISSION OF CAMERA IMAGES

S202 RECEIVED INSTRUCTIONAL DATA? NO / YES

S203 CAN INSTRUCTIONAL IMAGE BE DISPLAYED? NO / YES

S204 PERFORM SECOND NOTIFICATION

S205 GENERATE VIRTUAL IMAGE DATA

S206 IS THERE INSTRUCTIONAL IMAGE LOCATED OUTSIDE VISIBLE AREA? YES / NO

S207 PERFORM FIRST NOTIFICATION

S208 IS THERE INSTRUCTIONAL IMAGE LOCATED INSIDE VISIBLE AREA? NO / YES

S209 OVERLAPS WORK OBJECT WHEN DISPLAYED AT DISPLAY POSITION? NO / YES

S210 ADJUST DISPLAY POSITION

S211 DISPLAY INSTRUCTIONAL IMAGE

S212 TERMINATION INSTRUCTED? NO / YES

END

WEARABLE TERMINAL DEVICE, PROGRAM, AND NOTIFICATION METHOD IN MIXED REALITY

TECHNICAL FIELD

The present disclosure relates to a wearable terminal device, a program, and a notification method.

BACKGROUND OF INVENTION

Heretofore, virtual reality (VR), mixed reality (MR), and augmented reality (AR) are known technologies that allow a user to experience virtual images and/or virtual spaces by using a wearable terminal device that is worn on the head of the user. A wearable terminal device includes a display that covers the field of view of the user when worn by the user. Virtual images and/or virtual spaces are displayed on this display in accordance with the position and orientation of the user in order to achieve a visual effect in which the virtual images and/or virtual spaces appear to actually exist (for example, specification of U.S. Patent Application Publication No. 2019/0087021 and specification of U.S. Patent Application Publication No. 2019/0340822).

MR is a technology that allows users to experience a mixed reality in which a real space and virtual images are merged together by displaying virtual images that appear to exist at prescribed positions in the real space while the user sees the real space. VR is a technology that allows a user to feel as though he or she is in a virtual space by allowing him or her to see a virtual space instead of a real space in MR.

Virtual images displayed in VR and MR have display positions defined in the space in which the user is located, and the virtual images are displayed on the display and are visible to the user when the display positions are within a visible area for the user.

SUMMARY

In the present disclosure, a wearable terminal device is configured to be used by being worn by a user. The wearable terminal device includes at least one processor. The at least one processor detects a visible area for the user inside a space and causes a display to display an instructional image located inside the visible area. When the instructional image is located outside the visible area, the at least one processor issues a first notification making the user aware of existence of the instructional image.

In the present disclosure, a program is configured to cause a computer to detect a visible area for the user inside a space, and cause a display to display an instructional image located inside the visible area, the computer being provided in a wearable terminal device configured to be used by being worn by the user. When the instructional image is located outside the visible area, the program causes the computer to issue a first notification making the user aware of existence of the instructional image.

In the present disclosure, a notification method is for use in a wearable terminal device configured to be used by being worn by a user. In the notification method, a visible area for the user inside a space is detected and a display is caused to display an instructional image located inside the visible area. In the notification method, when the instructional image is located outside the visible area, a first notification making the user aware of existence of the instructional image is issued.

BRIEF DESCRIPTION OF THE DRAWINGS

FIG. 17 is a flowchart illustrating a control procedure of remote instruction processing executed by a wearable terminal device.

DESCRIPTION OF EMBODIMENTS

Hereafter, embodiments will be described based on the drawings. However, for convenience of explanation, each figure referred to below is a simplified illustration of only the main components that are needed in order to describe the embodiments. Therefore, a wearable terminal device 10, an external device 20, and an information processing apparatus 80 of the present disclosure may include any components not illustrated in the referenced figures.

First Embodiment

Figure 1:
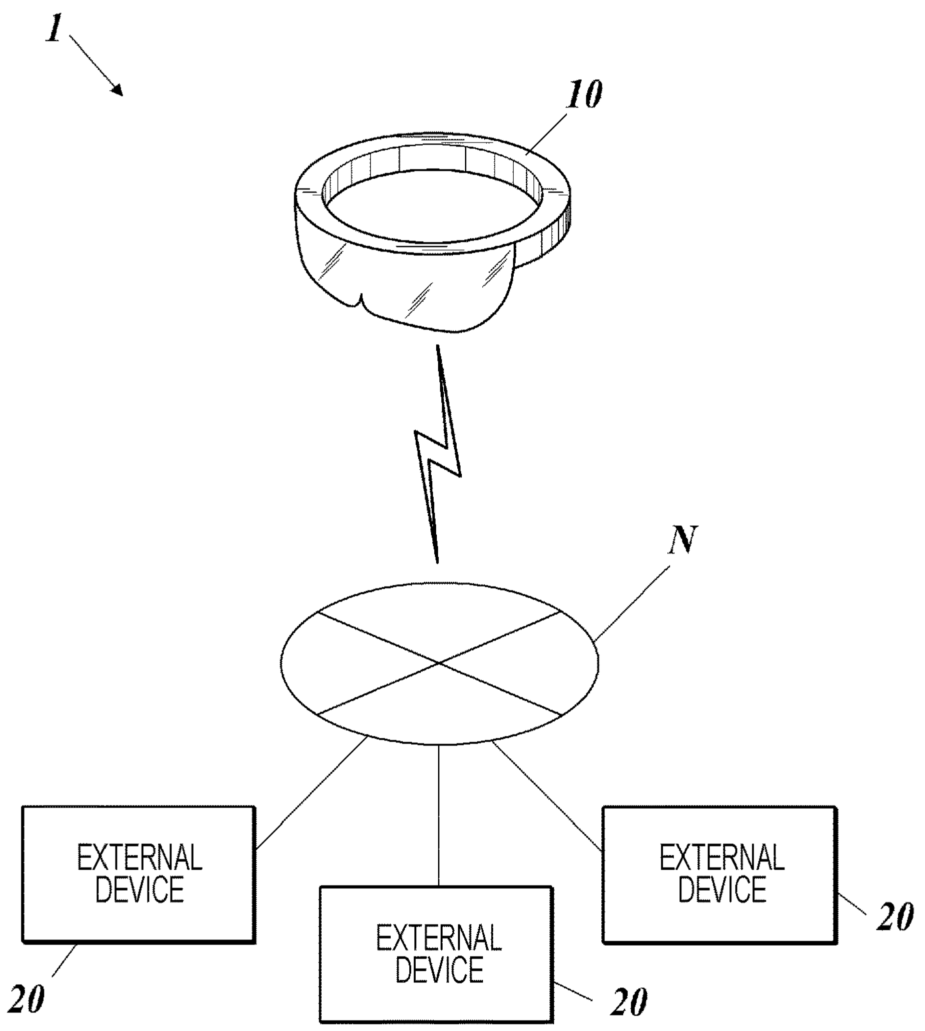
FIG. 1 is a schematic diagram illustrating the configuration of a display system according to a First Embodiment.

As illustrated in FIG. 1, a display system 1 includes a wearable terminal device 10 and multiple external devices 20. The display system 1 and the external devices 20 are connected to each other via a network N so as to be able to communicate with each other. The network N may be, but is not limited to, the Internet. The display system 1 may include multiple wearable terminal devices 10. Alternatively, there may be just a single external device 20 in the display system 1.

The wearable terminal device 10 is a device that allows a user (wearer) to experience MR. In this embodiment, a user performing prescribed work wears the wearable terminal device 10. Each external device 20 is operated by a remote instructor who gives instructions to the user wearing the wearable terminal device 10 from a remote location via the wearable terminal device 10.

Figure 2:
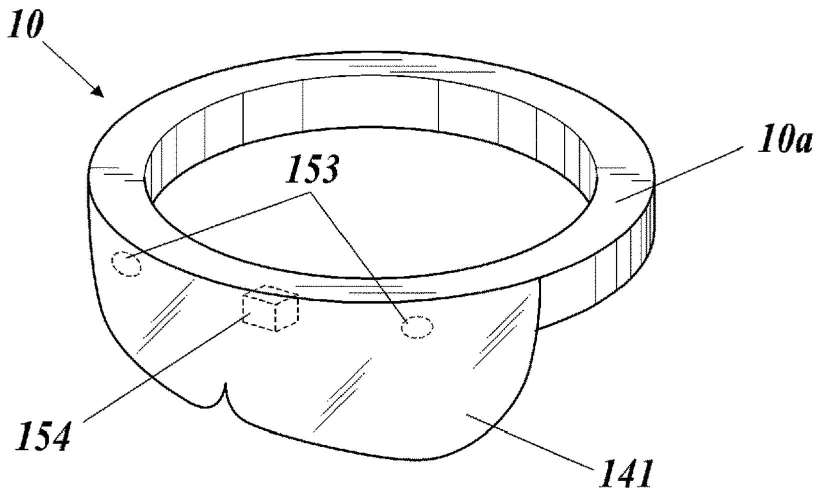
FIG. 2 is a schematic perspective view illustrating the configuration of a wearable terminal device.

As illustrated in FIG. 2, the wearable terminal device 10 includes a body 10*a* and a visor 141 (display member) attached to the body 10*a*.

The body 10*a* is a ring-shaped member whose circumference can be adjusted. Various devices, such as a depth sensor 153 and a camera 154, are built into the body 10*a*. When the body 10*a* is worn on the user's head, the user's field of view is covered by the visor 141.

The visor 141 is transparent to light. The user can see a real space through the visor 141. An image such as a virtual image is projected and displayed on a display surface of the visor 141, which faces the user's eyes, from a laser scanner 142 (refer to FIG. 5), which is built into the body 10*a*. The user sees the virtual image in the form of light reflected from the display surface. At this time, since the user is also viewing the real space through the visor 141, a visual effect is obtained as though the virtual image exists in the real space.

Figure 3:
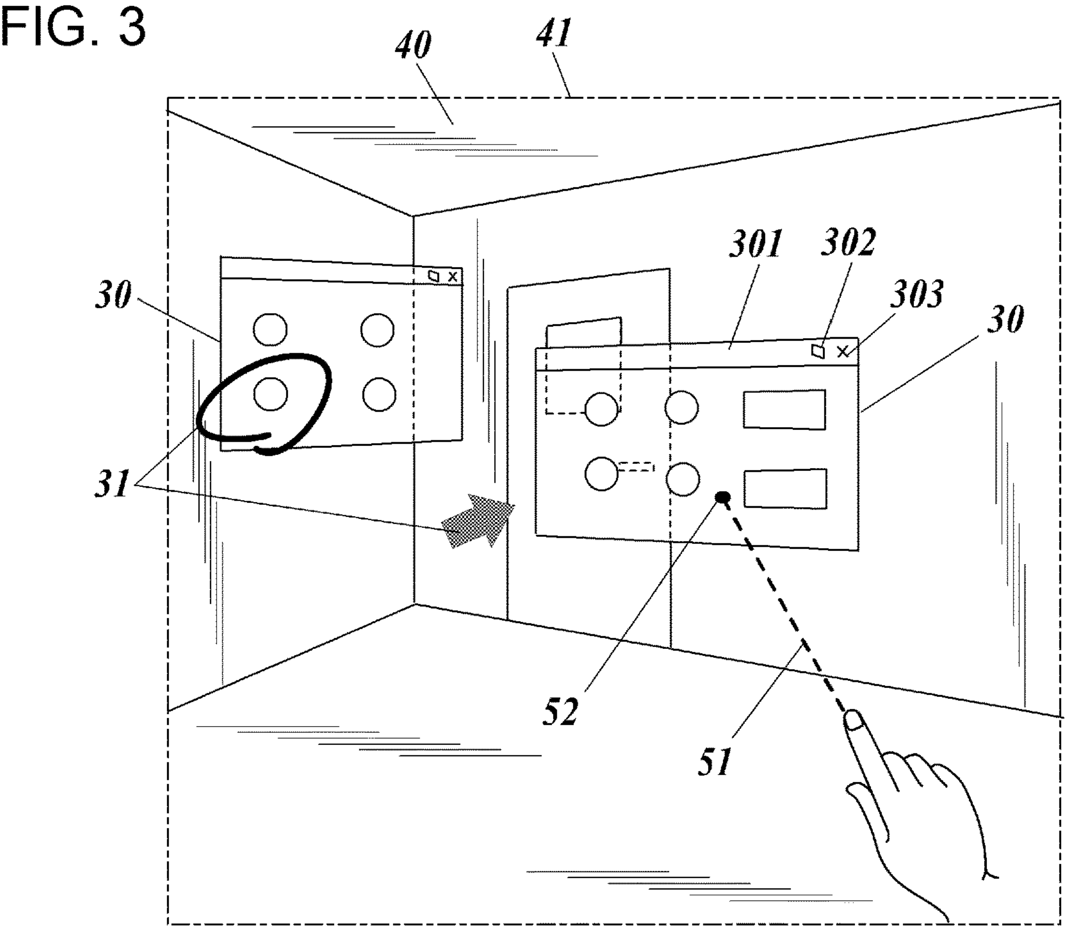
FIG. 3 illustrates an example of a visible area and a virtual image seen by a user wearing a wearable terminal device.

As illustrated in FIG. 3, with virtual images 30 displayed, the user sees the virtual images 30 at prescribed positions in a space 40 with the virtual images 30 facing in prescribed directions. In this embodiment, the space 40 is the real space that the user sees through the visor 141. The virtual images 30 are projected onto a light-transmissive visor 141 so as to be seen as translucent images superimposed on the real space. In FIG. 3, an example is illustrated in which the virtual images 30 are flat window screens. The virtual images 30 also include instructional images 31 for providing instructions or explanations to the user of the wearable terminal device 10. In other words, the instructional images 31 are a form of virtual image 30. In FIG. 3, an instructional image 31 of an arrow and an instructional image 31 of a path traced by pen input are illustrated as examples. The virtual images 30 are not limited to these example, and may be various types of three-dimensional images, for example. If the virtual images 30 are window screens, the virtual images 30 have front surfaces (first surfaces) and rear surfaces (second surfaces), and necessary information is displayed on the front surfaces and typically no information is displayed on the rear surfaces.

Figure 4:
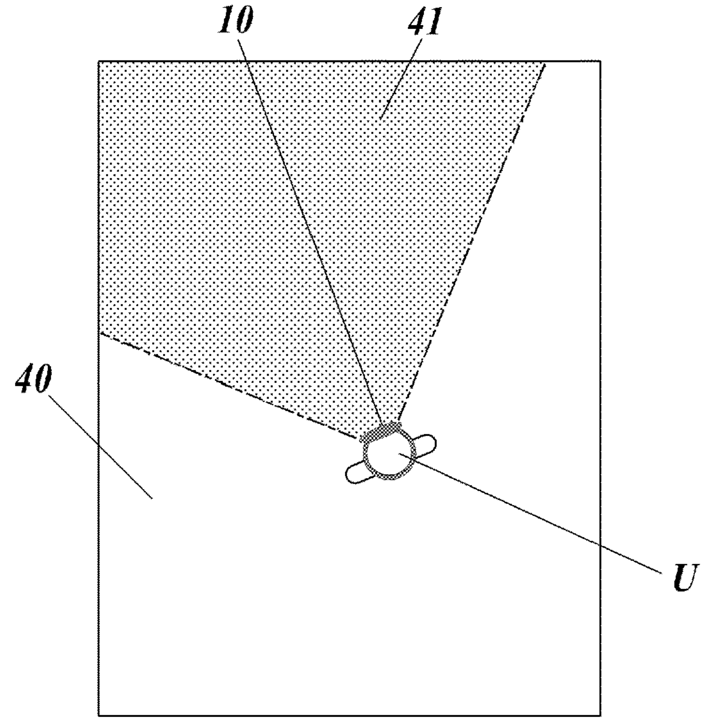
FIG. 4 is a diagram for explaining a visible area in space.

The wearable terminal device 10 detects a visible area 41 for the user based on the position and orientation of the user in the space 40 (in other words, the position and orientation of the wearable terminal device 10). As illustrated in FIG. 4, the visible area 41 is the area of the space 40 that is located in front of a user U wearing the wearable terminal device 10. For example, the visible area 41 is an area within a prescribed angular range from the front of user U in the left-right directions and up-down directions. In this case, a cross section obtained when a three-dimensional object corresponding to the shape of the visible area 41 is cut along a plane perpendicular to the frontal direction of the user U is rectangular. The shape of the visible area 41 may be defined so that the cross section has a shape other than a rectangular shape (for example, a circular or oval shape). The shape of the visible area 41 (for example, the angular range from the front in left-right directions and up-down directions) can be specified for example using the following method.

In the wearable terminal device 10, the field of view is adjusted (hereinafter referred to as "calibrated") in a prescribed procedure at a prescribed timing, such as when the device is first started up. In this calibration, the area that can be seen by the user identified, and the virtual images 30 are displayed within that area thereafter. The shape of the visible area 41 can be set as the shape of the visible area identified by this calibration.

Calibration is not limited to being performed using the prescribed procedure described above, and calibration may be performed automatically during normal operation of the wearable terminal device 10. For example, if the user does not react to a display that the user is supposed to react to, the field of view (and the shape of the visible area 41) may be adjusted while assuming that the area where the display is performed is outside the user's field of view. The field of view (and the shape of the visible area 41) may be adjusted by performing display on a trial basis at a position that is defined as being outside the range of the field of view, and if the user does react to the display, the area where the display is performed may be considered as being within the range of the user's field of view.

The shape of the visible area 41 may be determined in advance and fixed at the time of shipment or the like and not based on the result of adjustment of the field of view. For example, the shape of the visible area 41 may be defined by the optical design of a display 14 to the maximum extent possible.

The virtual images 30 are generated in accordance with prescribed operations performed by the user with display positions and orientations defined in the space 40. The instructional images 31, among the virtual images 30, are generated based on instructional data transmitted from the external devices 20 to the wearable terminal device 10, for example. The instructional images 31 can also be generated by the user of the wearable terminal device 10 to serve as reminders and so forth. Out of the generated virtual images 30, the wearable terminal device 10 displays the virtual images 30 whose display positions are defined inside the visible area 41 by projecting the virtual images 30 onto the visor 141. In FIG. 3, the visible area 41 is represented by a chain line.

The display positions and orientations of the virtual images 30 on the visor 141 are updated in real time in accordance with changes in the visible area 41 for the user. In other words, the display positions and orientations of the virtual images 30 change in accordance with changes in the visible area 41 so that the user perceives that "the virtual images 30 are located within the space 40 at set positions and with set orientations". For example, as the user moves from the front sides to the rear sides of the virtual images 30, the shapes (angles) of the displayed virtual images 30 gradually change in accordance with this movement. When the user moves around to the rear side of a virtual image 30 and then turns toward the virtual image 30, the rear surface of the virtual image 30 is displayed so that the user can see the rear surface. In accordance with changes in the visible area 41, the virtual images 30 whose display positions have shifted out of the visible area 41 are no longer displayed, and if there are any virtual images 30 whose display positions have now entered the visible area 41, those virtual images 30 are newly displayed.

As illustrated in FIG. 3, when the user holds his or her hand (or finger) forward, the direction in which the hand is extended is detected by the wearable terminal device 10, and a virtual line 51 extending in that direction and a pointer 52 are displayed on the display surface of the visor 141 for the user to see. The pointer 52 is displayed at the intersection of the virtual line 51 and a virtual image 30. If the virtual line 51 does not intersect any virtual image 30, the pointer 52 may be displayed at the intersection of the virtual line 51 and a wall of the space 40 or the like. When the distance between the hand of the user and the virtual image 30 is within a prescribed reference distance, the pointer 52 may be directly displayed at a position corresponding to the finger tip of the user without displaying the virtual line 51.

The user can adjust the direction of the virtual line 51 and the position of the pointer 52 by changing the direction in which the user extends his or her hand. When a prescribed gesture is performed with the pointer 52 adjusted so as to be positioned at a prescribed operation target (for example, a function bar 301, a window shape change button 302, or a close button 303) included in the virtual image 30, the gesture can be detected by the wearable terminal device 10 and a prescribed operation can be performed on the operation target. For example, with the pointer 52 aligned with the close button 303, the virtual image 30 can be closed (deleted) by performing a gesture for selecting an operation target (for example, a pinching gesture made using the fingertips). The virtual image 30 can be moved in the depth direction and in left-right directions by making a selection gesture with the pointer 52 aligned with the function bar 301, and then making a gesture of moving the hand back and forth and left and right while maintaining the selection gesture. Operations that can be performed on the virtual images 30 are not limited to these examples.

Thus, the wearable terminal device 10 of this embodiment can realize a visual effect as though the virtual images 30 exist in the real space, and can accept user operations performed on the virtual images 30 and reflect these operations in the display of the virtual images 30. In other words, the wearable terminal device 10 of this embodiment provides MR.

Next, the functional configuration of the wearable terminal device 10 will be described while referring to FIG. 5.

The wearable terminal device 10 includes a central processing unit (CPU) 11, a random access memory (RAM) 12, a storage unit 13, the display 14, a sensor unit 15, a communication unit 16, a microphone 17, and a speaker 18, and these components are connected to each other by a bus 19. Each of the components illustrated in FIG. 5, except for the visor 141 of the display 14, is built into the body **10*a* and operates with power supplied from a battery, which is also built into the body 10*a***.

The CPU 11 is a processor that performs various arithmetic operations and performs overall control of the operations of the various parts of the wearable terminal device 10. The CPU 11 reads out and executes a program 131 stored in storage unit 13 in order to perform various control operations. The CPU 11 executes the program 131 in order to perform, for example, visible area detection processing, display control processing, and notification processing. Among these processing operations, the visible area detection processing is processing for detecting the visible area 41 for the user inside the space 40. The display control processing is processing for causing the display 14 to display the virtual images 30 whose positions are defined inside the visible area 41 from among the virtual images 30 whose positions are defined in the space 40. The notification processing is processing for issuing notifications to make the user aware of the presence of instructional images 31 outside the visible area 41.

Figure 5:
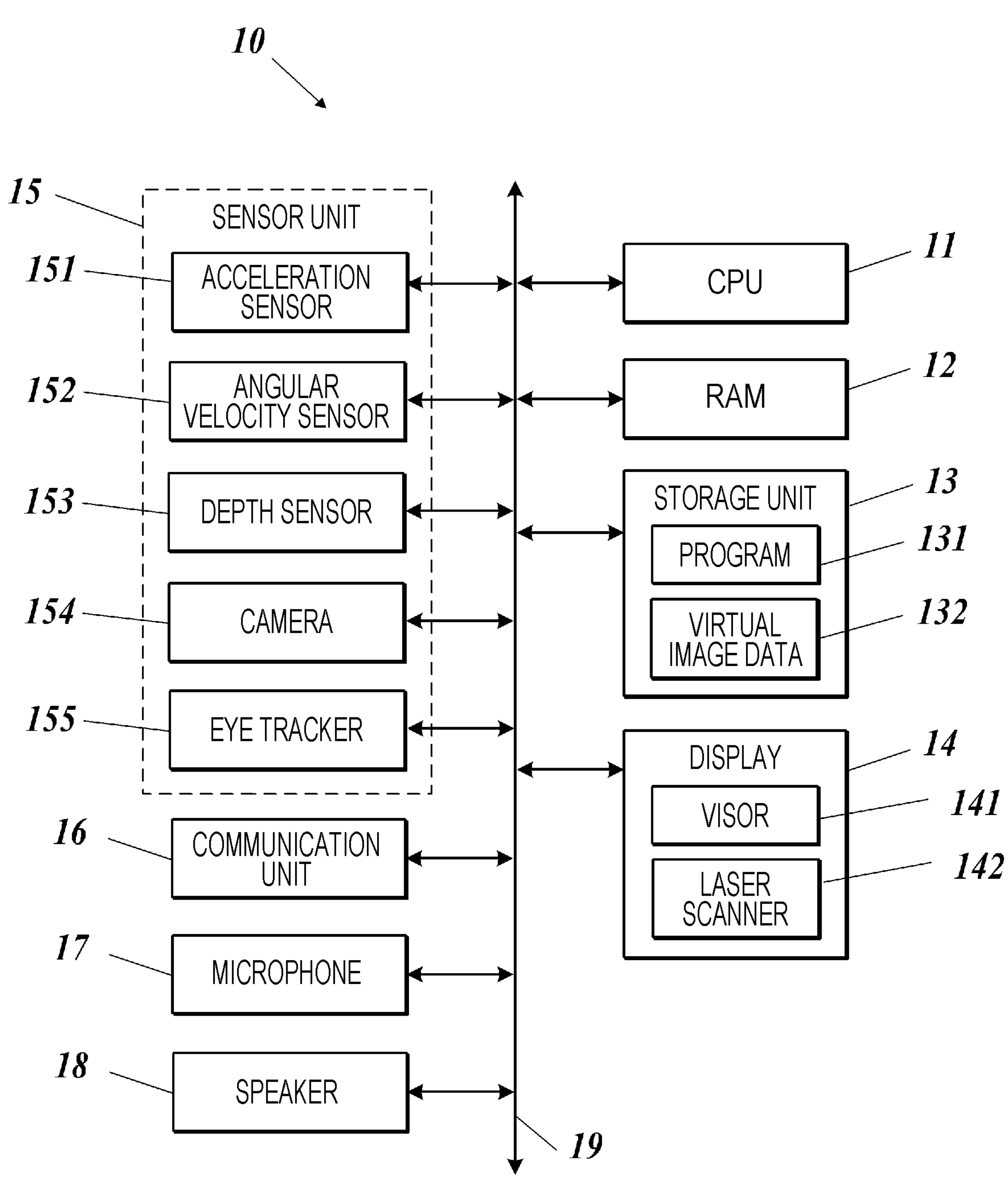
FIG. 5 is a block diagram illustrating the main functional configuration of a wearable terminal device.

A single CPU 11 is illustrated in FIG. 5, but the configuration is not limited to a single CPU 11. Two or more processors, such as CPUs, may be provided, and these two or more processors may share the processing performed by the CPU 11 in this embodiment.

The RAM 12 provides a working memory space for the CPU 11 and stores temporary data.

The storage unit 13 is a non-transitory recording medium that can be read by the CPU 11 serving as a computer. The storage unit 13 stores the program 131 executed by the CPU 11 and various settings data. The program 131 is stored in storage unit 13 in the form of computer-readable program code. For example, a nonvolatile storage device such as a solid state drive (SSD) including a flash memory can be used as the storage unit 13.

The data stored in storage unit 13 includes virtual image data 132 relating to virtual images 30. The virtual image data 132 includes data relating to display content of the virtual images 30 (for example, image data), display position data, and orientation data. The virtual image data 132 relating to the instructional image 31 of an arrow includes data on the size, color, display position, and orientation of the arrow. The virtual image data 132 relating to the instructional image 31 of the path traced by pen input includes data on the thickness, color, display position (including coordinates of each point along path), and the orientation of the path. The virtual image data 132 relating to the instructional image 31 of a document image includes data on the content of the document image and the size, color, display position, and orientation of the window.

The display 14 includes the visor 141, the laser scanner 142, and an optical system that directs light output from the laser scanner 142 to the display surface of the visor 141. The laser scanner 142 irradiates the optical system with a pulsed laser beam, which is controlled so as to be switched on and off for each pixel, while scanning the beam in prescribed directions in accordance with a control signal from the CPU 11. The laser light incident on the optical system forms a display screen composed of a two-dimensional pixel matrix on the display surface of the visor 141. The method employed by the laser scanner 142 is not particularly limited, but for example, a method in which the laser light is scanned by operating a mirror using micro electro mechanical systems (MEMS) can be used. The laser scanner 142 includes three light-emitting units that emit laser light in colors of RGB, for example. The display 14 can perform color display by projecting light from these light-emitting units onto the visor 141.

The sensor unit 15 includes an acceleration sensor 151, an angular velocity sensor 152, the depth sensor 153, the camera 154, and an eye tracker 155. The sensor unit 15 may further include sensors that are not illustrated in FIG. 5.

The acceleration sensor 151 detects the acceleration and outputs the detection results to the CPU 11. From the detection results produced by the acceleration sensor 151, translational motion of the wearable terminal device 10 in directions along three orthogonal axes can be detected.

The angular velocity sensor 152 (gyro sensor) detects the angular velocity and outputs the detection results to the CPU 11. The detection results produced by the angular velocity sensor 152 can be used to detect rotational motion of the wearable terminal device 10.

The depth sensor 153 is an infrared camera that detects the distance to a subject using the time of flight (ToF) method, and outputs the distance detection results to the CPU 11. The depth sensor 153 is provided on a front surface of the body 10*a* such that images of the visible area 41 can be captured. The entire space 40 can be three-dimensionally mapped (i.e., a three-dimensional structure can be acquired) by repeatedly performing measurements using the depth sensor 153 each time the position and orientation of the user change in the space 40 and then combining the results.

The camera 154 captures images of the space 40 using a group of RGB imaging elements, acquires color image data as results of the image capturing, and outputs the results to the CPU 11. The camera 154 is provided on the front surface of the body 10*a* so that images of the visible area 41 can be captured. The images output from the camera 154 are used to detect the position, orientation, and so on of the wearable terminal device 10, and are also transmitted from the communication unit 16 to the external devices 20 and used to display the visible area 41 for the user of the wearable terminal device 10 on the external devices 20. If the viewing angle (angle of view) of the camera 154 and the viewing angle of a human do not match, the visible area 41 recognized by the wearable terminal device 10 does not need to be the same as the image output from the camera 154. In other words, if the viewing angle (angle of view) of the camera 154 is wider than the viewing angle of a human, the visible area 41 recognized by the wearable terminal device 10 may be an area corresponding to a portion of the image output from the camera 154 that is displayed on the external devices 20. The human visual field can be broadly classified into the effective visual field, which is the range within which humans are able to maintain high visual acuity and recognize detailed objects (generally, the effective visual field when using both the left and right eyes is approximately 60 degrees horizontally and 40 degrees vertically), and the peripheral visual field, which is the range outside the effective visual field (the range in which detailed objects cannot be recognized). The visible area 41 may be defined so as to correspond to the effective field of view, or may be defined so as to correspond to a field of view including the peripheral field of view (generally, around 200 degrees horizontally and 130 degrees vertically when both the left and right eyes are used). The visible area 41 may be defined so as to correspond to the effective field of view or may be defined so as to correspond to a field of view including the peripheral field of view, and the CPU 11 of the wearable terminal device 10 may change the visible area 41 so as to be based on either of these definitions as appropriate, depending on prescribed conditions (such as a mode change initiated by a prescribed operation performed by the user).

The eye tracker 155 detects the user's line of sight and outputs the detection results to the CPU 11. The method used for detecting the line of sight is not particularly limited, but for example, a method can be used in which an eye tracking camera is used to capture images of the reflection points of near-infrared light in the user's eyes, and the results of that image capturing and the images captured by the camera 154 are analyzed in order to identify a target being looked at by the user. Part of the configuration of the eye tracker 155 may be provided in or on a peripheral portion of the visor 141, for example.

The communication unit 16 is a communication module that includes an antenna, a modulation-demodulation circuit, and a signal processing circuit. The communication unit 16 transmits and receives data via wireless communication with the external devices 20 in accordance with a prescribed communication protocol. The communication unit 16 also communicates speech data to and from the external devices 20. In other words, the communication unit 16 transmits speech data collected by the microphone 17 to the external devices 20 and receives speech data transmitted from the external devices 20 in order to output speech from the speaker 18.

The microphone 17 converts sounds such as speech of the user into electrical signals and outputs the electrical signals to the CPU 11.

The speaker 18 converts the input speech data into mechanical vibrations and outputs the mechanical vibrations as sound.

In the wearable terminal device 10 having the above-described configuration, the CPU 11 performs the following control operations.

The CPU 11 performs three-dimensional mapping of the space 40 based on distance data to a subject input from the depth sensor 153. The CPU 11 repeats this three-dimensional mapping whenever the position and orientation of the user change, and updates the results each time. The CPU 11 also performs three-dimensional mapping for each connected space 40 serving as a unit. Therefore, when the user moves between multiple rooms that are partitioned from each other by walls and so on, the CPU 11 recognizes each room as a single space 40 and separately performs three-dimensional mapping for each room.

The CPU 11 detects the visible area 41 for the user in the space 40. In detail, the CPU 11 identifies the position and orientation of the user (wearable terminal device 10) in the space 40 based on detection results from the acceleration sensor 151, the angular velocity sensor 152, the depth sensor 153, the camera 154, and the eye tracker 155, and accumulated three-dimensional mapping results. The visible area 41 is then detected (identified) based on the identified position and orientation and the predetermined shape of the visible area 41. The CPU 11 continuously detects the position and orientation of the user in real time, and updates the visible area 41 in conjunction with changes in the position and orientation of the user. The visible area 41 may be detected using detection results from some of the components out of the acceleration sensor 151, the angular velocity sensor 152, the depth sensor 153, the camera 154, and the eye tracker 155.

The CPU 11 generates the virtual image data 132 relating to the virtual images 30 in accordance with operations performed by the user. In other words, upon detecting a prescribed operation (gesture) instructing generation of a virtual image 30, the CPU 11 identifies the display content (for example, image data), display position, and orientation of the virtual image, and generates virtual image data 132 including data representing these specific results.

The CPU 11 causes the display 14 to display the virtual images 30 whose display positions are defined inside the visible area 41, in other words, the virtual images 30 located inside the visible area 41. The CPU 11 identifies virtual images 30 that are to be displayed based on information of the display positions included in the virtual image data 132, and generates image data of the display screen to be displayed on the display 14 based on the positional relationship between the visible area 41 and the display positions of the virtual images 30 at that point in time. The CPU 11 causes the laser scanner 142 to perform a scanning operation based on this image data in order to form a display screen containing the virtual images 30 on the display surface of the visor 141. In other words, the CPU 11 causes the virtual images 30 to be displayed on the display surface of the visor 141 so that the virtual images 30 are visible in the space 40 seen through the visor 141. By continuously performing this display control processing, the CPU 11 updates the display contents displayed on the display 14 in real time so as to match the user's movements (changes in the visible area 41). If the wearable terminal device 10 is set up to continue holding the virtual image data 132 even after the wearable terminal device 10 is turned off, the next time the wearable terminal device 10 is turned on, the existing virtual image data 132 is read and if there are virtual images 30 located inside the visible area 41, these virtual images 30 are displayed on the display 14.

The CPU 11 detects the position and orientation of the user's hand (and/or fingers) based on images captured by the depth sensor 153 and the camera 154, and causes the display 14 to display a virtual line 51 extending in the detected direction and the pointer 52. The CPU 11 detects a gesture made by the user's hand (and/or fingers) based on images captured by the depth sensor 153 and the camera 154, and performs processing in accordance with the content of the detected gesture and the position of the pointer 52 at that time.

Figure 6:
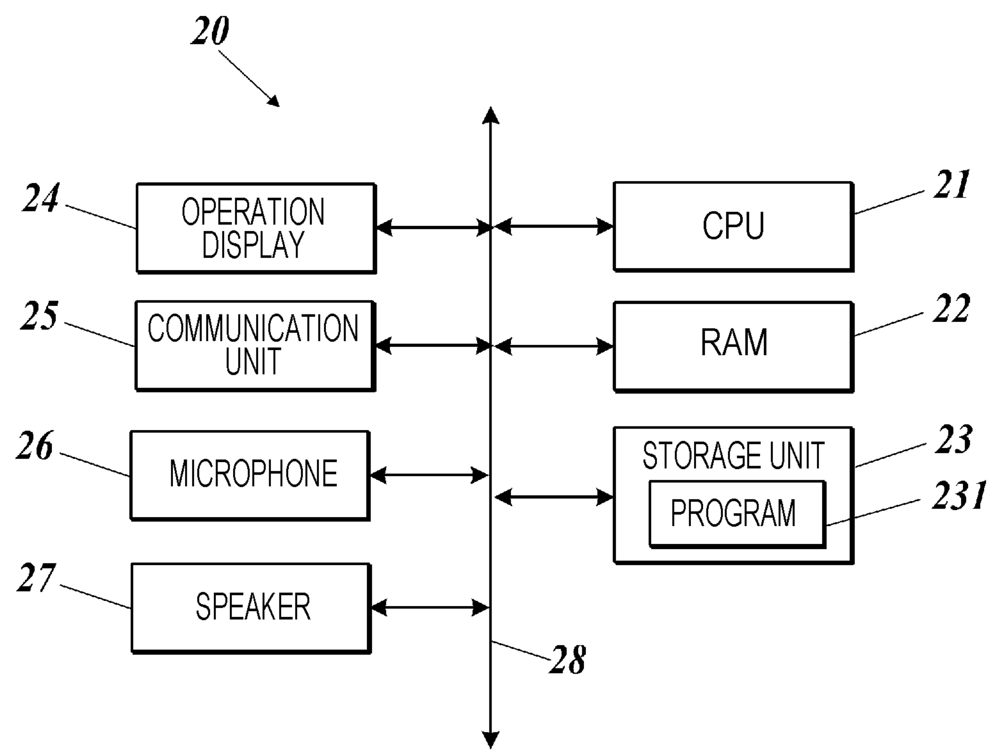
FIG. 6 is a block diagram illustrating the main functional configuration of an external device.

As illustrated in FIG. 6, each external device 20 includes a CPU 21, a RAM 22, a storage unit 23, an operation display 24, a communication unit 25, a microphone 26, and a speaker 27, and these components are connected to each other by a bus 28.

The CPU 21 is a processor that performs various arithmetic operations and performs overall control of the operation of the various parts of the external device 20. The CPU 21 reads out and executes a program 231 stored in storage unit 23 in order to perform various control operations.

The RAM 22 provides a working memory space for the CPU 21 and stores temporary data.

The storage unit 23 is a non-transitory recording medium that can be read by the CPU 21 serving as a computer. The storage unit 23 stores the program 231 executed by the CPU 21 and various settings data. The program 231 is stored in storage unit 23 in the form of computer-readable program code. For example, a nonvolatile storage device such as an SSD containing a flash memory or a hard disk drive (HDD) can be used as the storage unit 23.

The operation display 24 includes a display device such as a liquid crystal display and input devices such as a mouse and keyboard. The operation display 24 displays various information about the display system 1, such as operating status and processing results, on the display device. The display includes, for example, an instructor screen 42 that includes an image of the visible area 41 captured by the camera 154 of the wearable terminal device 10. The content of the instructor screen 42 will be described in detail later. The operation display 24 converts operations input to the input devices by the user into operation signals and outputs the operation signals to the CPU 21.

The communication unit 25 transmits data to and receives data from the wearable terminal device 10 in accordance with a prescribed communication protocol. The communication unit 25 also communicates speech data to and from the wearable terminal device 10. In other words, the communication unit 25 transmits speech data collected by the microphone 26 to the wearable terminal device 10 and receives speech data transmitted from the wearable terminal device 10 in order to output speech from the speaker 27. The communication unit 25 may also be capable of communicating with devices other than the wearable terminal device 10.

The microphone 26 converts sound, such as the voice of a remote instructor, into electrical signals and outputs the electrical signals to the CPU 21.

The speaker 27 converts the input speech data into mechanical vibrations and outputs the mechanical vibrations as sound.

Next, operation of the display system 1 will be described focusing on operations relating to remote instruction (remote assistance) from a remote instructor operating the external device 20 to a user wearing the wearable terminal device 10.

In the display system 1 of this embodiment, bi-directional data communication can be performed between the wearable terminal device 10 and one or more external devices 20 to allow sharing of various data and collaborative work. For example, data of the images being captured by the camera 154 of the wearable terminal device 10 can be transmitted to the external device 20 and displayed on the operation display 24, and in this way, the remote instructor is able to perceive in real time what the user of the wearable terminal device 10 is seeing. The speech collected by the microphone 17 of the wearable terminal device 10 and the microphone 26 of the external device 20 can be transmitted via bidirectional speech data communication in order to carry out a voice call. Therefore, the period during which speech data communication is being performed by the wearable terminal device 10 and the external device 20 includes a period during which the user of the wearable terminal device 10 and the remote instructor are carrying out a voice call. The remote instructor can provide instructions and assistance to the user of the wearable terminal device 10 via a voice call while viewing the real-time camera images.

In addition, the external device 20 can also instruct the wearable terminal device 10 to display the instructional images 31. In other words, the remote instructor can perform prescribed operations on the external device 20 in order to cause the display 14 of the wearable terminal device 10 to display the instructional images 31, as illustrated in FIG. 3.

In detail, when the remote instructor issues an instruction to display a desired instructional image 31 at a desired position while viewing the camera image on the external device 20, instructional data for causing the instructional image 31 to be displayed is generated and transmitted to the wearable terminal device 10. The CPU 11 of the wearable terminal device 10 that has received this instructional data generates the virtual image data 132 relating to the instructional image 31 based on the received instructional data. Hereafter, generating the virtual image data 132 relating to the instructional image 31 is also simply referred to as "generating the instructional image 31". The CPU 11 displays the generated instructional image 31 at the display position specified by the virtual image data 132 within the space 40. In detail, the CPU 11 causes the display 14 to display instructional images 31 whose display positions are defined inside the visible area 41, in other words, the instructional images 31 located inside the visible area 41. However, the CPU 11 does not cause the display 14 to display instructional images 31 whose display positions are defined outside the visible area 41, in other words, the instructional images 31 located outside the visible area 41. This allows the remote instructor to display an instructional image 31 with content desired by the remote instructor at a position intended by the remote instructor, and the user of the wearable terminal device 10 is able to see and share the instructional image 31.

The CPU 11 also causes the display 14 to display the instructional image 31 during the execution of speech data communication via the communication unit 16. This allows the user of the wearable terminal device 10 to carry out work in accordance with instructions given by the remote instructor via a voice call while viewing the instructional image 31.

The instructional images 31 may include images of virtual objects, and the virtual objects may include an arrow-shaped object (arrow) having a specified position and orientation. The virtual objects may also include an object representing a path traced by pen input. The object representing a path traced by pen input may be, for example, handwritten characters or a drawing. The path traced by pen input may be identified from detection results of a path traced by the user's fingertip, or based on the path of movement of the tip of a prescribed pen input device held by the user or remote instructor.

The instructional images 31 may be document images in a prescribed file format. Document images serving as instructional images are displayed as window screens, for example, as illustrated by the virtual images 30 in FIG. 3. The document images may be instructions or a manual illustrating steps for the work to be performed. The file format of the document images may be a file format relating to image data, such as JPEG, PDF, or a file format of any other file generated by software.

Figure 7:
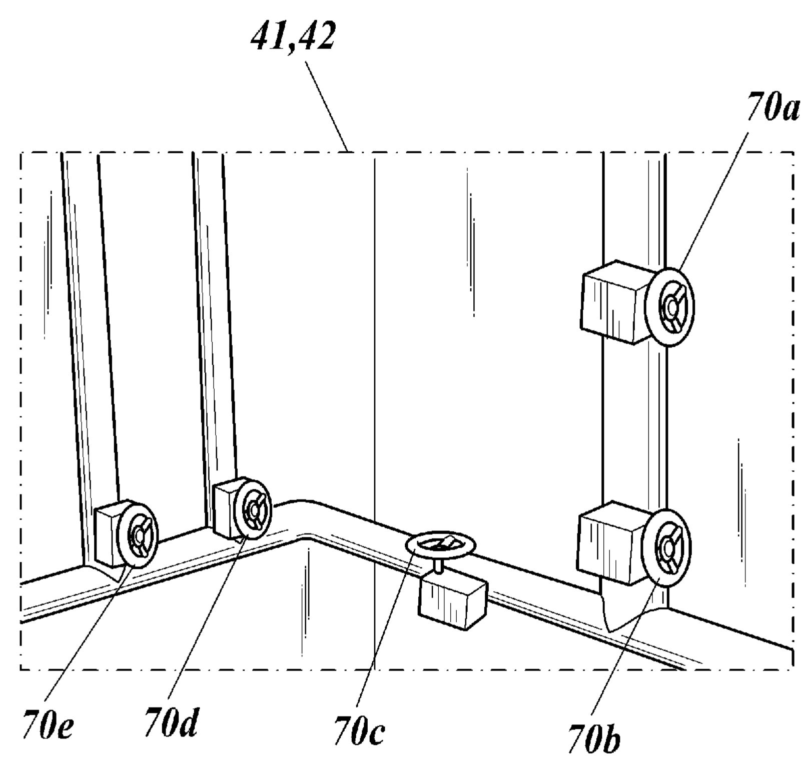
FIG. 7 is a diagram illustrating a visible area and an instructor screen at the start of an instructional image generation operation.

Next, a specific example of operations related to generating instructional images 31 will be described while referring to FIGS. 7 to 12. As illustrated in FIG. 7, the visible area 41 at a certain point in time is assumed to include handles 70*a* to 70*e* of valves that are work objects. An image of this visible area 41 is captured by the camera 154, transmitted to the external device 20, and displayed as an instructor screen 42 on the operation display 24.

Figure 8:
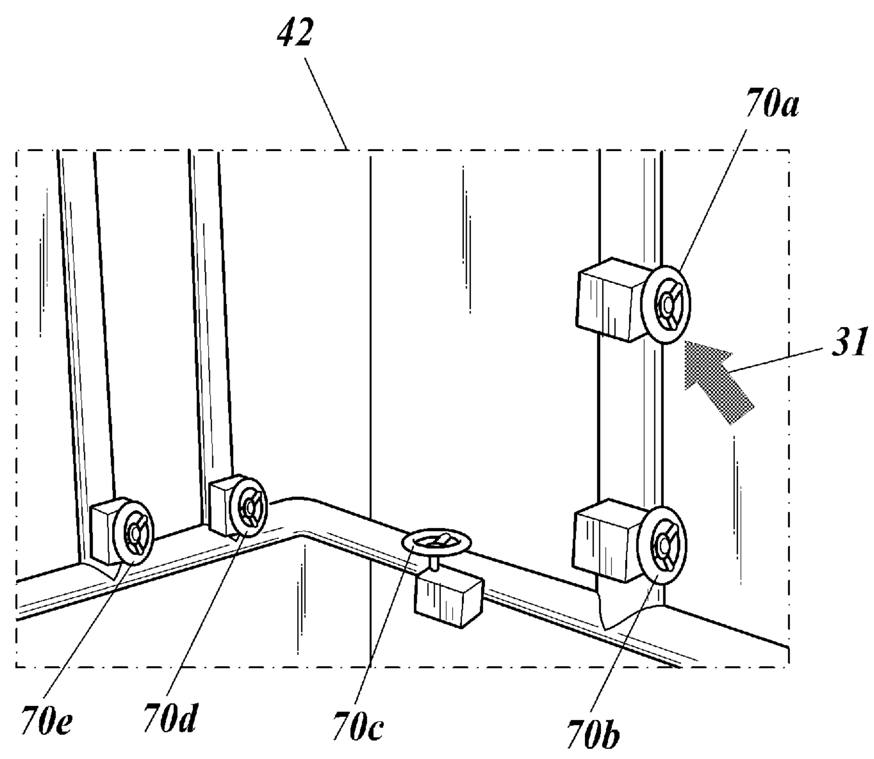
FIG. 8 is a diagram illustrating an instructional image on an instructor screen.

A case in which a remote instructor, who is looking at the instructor screen 42 illustrated in FIG. 7, instructs the user of the wearable terminal device 10 in how to operate the handle 70*a* will be described as an example. In this case, the remote instructor pauses the instructor screen 42 in the state illustrated in FIG. 7 and performs a prescribed operation in order to display the instructional image 31 of an arrow near the handle 70*a*, as illustrated in FIG. 8, for example. In response to this operation, instructional data for allowing the instructional image 31 to be displayed at a display position near the handle 70*a* is generated and transmitted from the external device 20 to the wearable terminal device 10. Upon receiving the instructional data, the CPU 11 of the wearable terminal device 10 generates the virtual image data 132 for allowing the instructional image 31 to be displayed at the instructed display position. When the display position of the instructional image 31 is inside the visible area 41 of the user, the CPU 11 causes the instructional image 31 to be displayed on the display 14.

Figure 9:
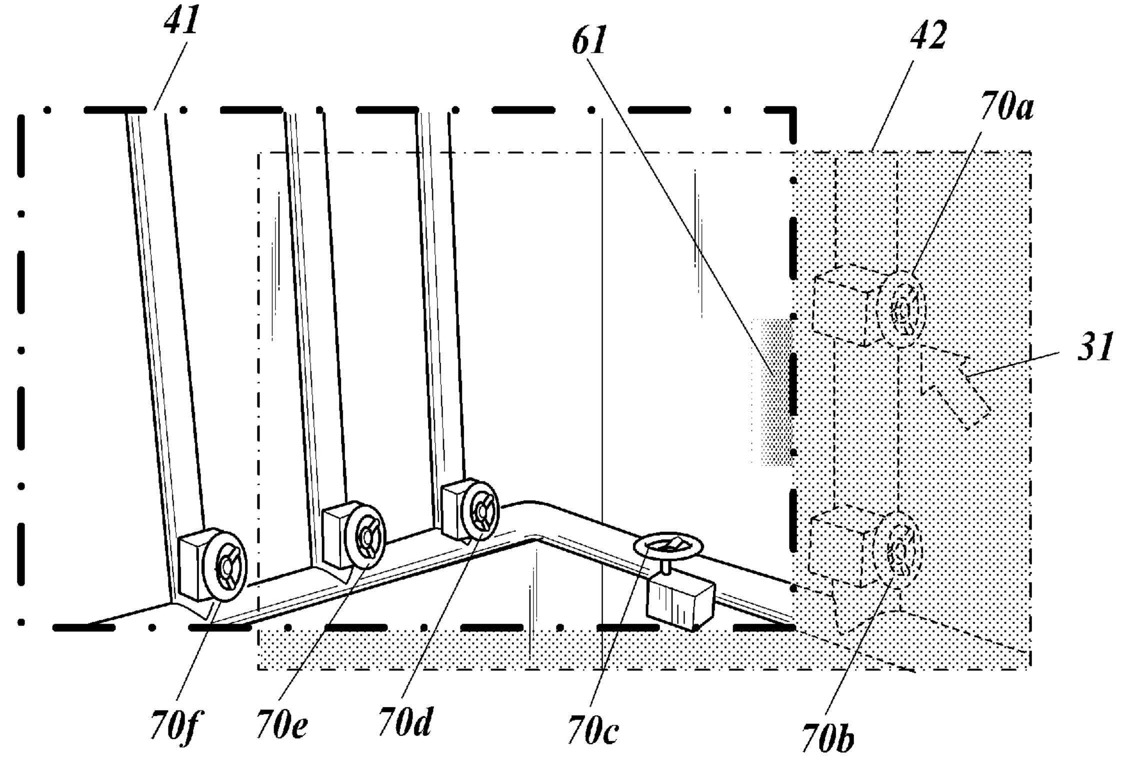
FIG. 9 is a diagram illustrating misalignment between an instructor screen and a visible area, and a first notification in the form of an indicator.

However, if the user of the wearable terminal device 10 moves or changes orientation while the remote instructor pauses the instructor screen 42 in order to instruct display of the instructional image 31, the visible area 41 will shift. As a result, as illustrated in FIG. 9, for example, a situation may occur in which the display position of the instructional image 31 is outside the visible area 41 at the time when the instructional image 31 is displayed based on the received instructional data. In this case, since the instructional image 31 is not displayed on the display 14, the user of the wearable terminal device 10 would not be aware of the instructional image 31 generated by the instruction issued by the remote instructor.

Accordingly, in the wearable terminal device 10 of this embodiment, the CPU 11 issues a first notification in order to make the user aware of the existence of the instructional image 31 when the instructional image 31 is located outside the visible area 41. In other words, the CPU 11 issues the first notification if the display position of the instructional image 31 is outside the visible area 41 at the time when the instructional image 31 is displayed in response to receiving the instructional data from the external device 20. For example, the CPU 11 issues a first notification that is recognizable by the user's sight. As an example, the first notification is a prescribed notification display performed by the display 14. As a result of this first notification being issued, the user of the wearable terminal device 10 is able to notice the presence of the instructional image 31 generated by the instruction of the remote instructor. In addition, the display 14 performs a notification display that is recognizable by the user's sight and this allows the user to easily notice the presence of the instructional image 31.

In the example illustrated in FIG. 9, the first notification is notification display including an indicator 61 indicating the direction in which the instructional image 31 is located. The indicator 61 is displayed at the periphery of the visible area 41 in the direction in which instructional image 31 is located. As a result of displaying the indicator 61, the user is able to intuitively grasp the direction in which the instructional image 31 is located. The shape, position, and manner of display of the indicator 61 are not limited to those illustrated in FIG. 9 and any shape, position, and manner of display are acceptable as long as the indicator 61 is able to indicate the direction in which the instructional image 31 is located.

Figure 10:
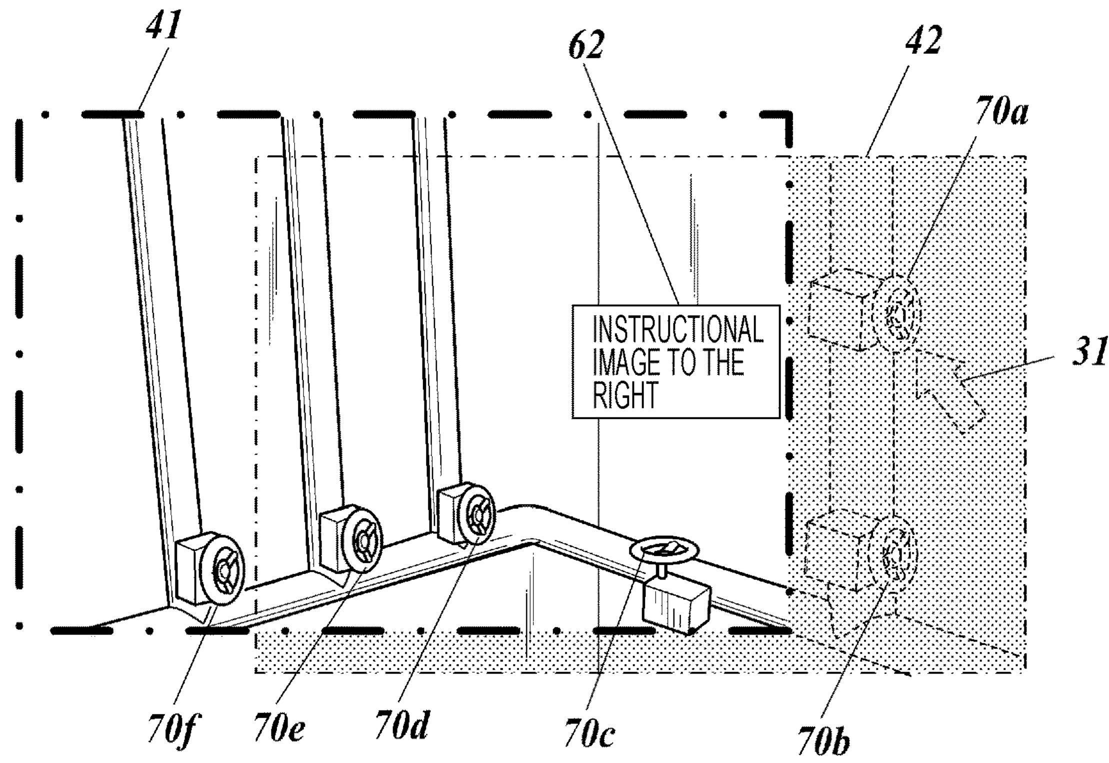
FIG. 10 is a diagram illustrating a first notification in the form of text.

As illustrated in FIG. 10, the first notification may be a notification display including text 62. Here, the text 62 is illustrated and indicates the presence of the instructional image 31 to the right. The first notification in the form of the text 62 can inform the user of more details about the instructional image 31.

Figure 11:
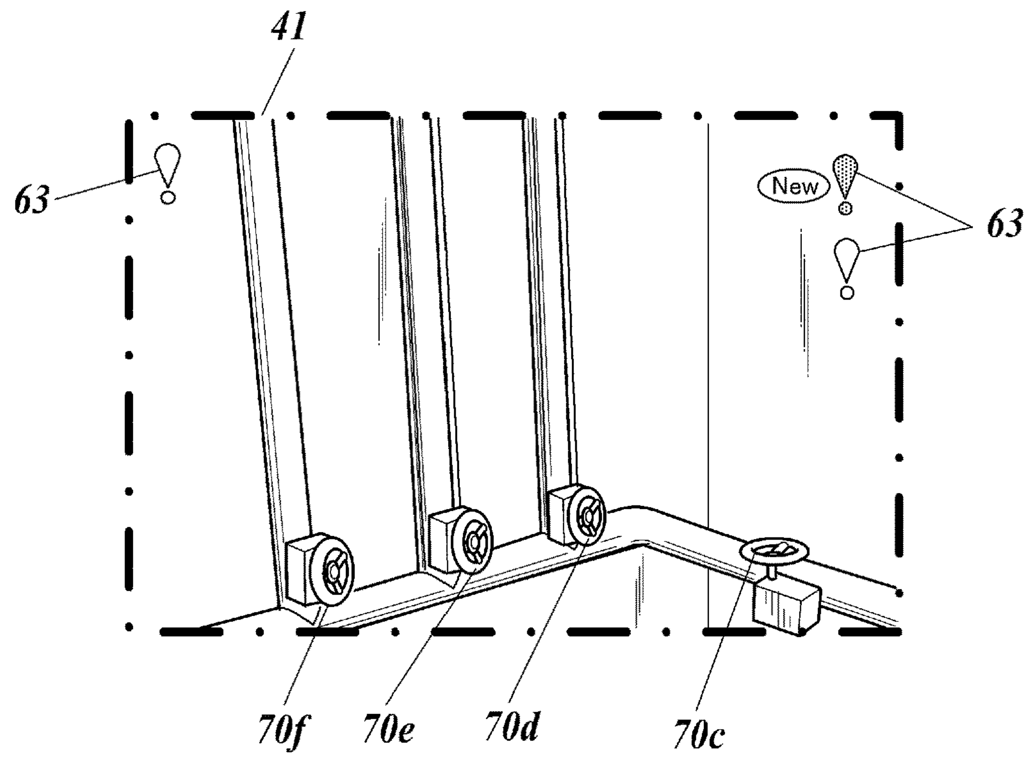
FIG. 11 is a diagram illustrating another example of a first notification.

The first notification, which is recognizable by the user's sight, is not limited to the notification displays illustrated in FIG. 9 and FIG. 10. For example, as illustrated in FIG. 11, a sign 63 corresponding to one instructional image 31 located outside of the visible area 41 may be displayed on the display 14. Therefore, if there are multiple instructional images 31 located outside the visible area 41, multiple signs 63 will be displayed. Here, a sign 63 corresponding to an instructional image 31 to the left of the visible area 41 may be displayed near the left edge of the visible area 41, and a sign 63 corresponding to an instructional image 31 to the right of the visible area 41 may be displayed near the right edge of the visible area 41. A sign 63 corresponding to a new instructional image 31 may be displayed in a prescribed highlighted manner in order to attract the user's attention. Here, the highlighted manner may include the display of letters or symbols such as "New", highlighting in a different color, or increasing the size of the shape of the sign. The "new instructional image 31" described above can be, for example, an instructional image 31 that has not been displayed on the display 14 before, and/or an instructional image 31 for which the time elapsed since the image was generated is less than or equal to a prescribed reference time. When a new instructional image 31 is displayed in the visible area 41, the instructional image 31 itself may be displayed in the highlighted manner described above. As illustrated in FIG. 11, when an instructional image 31 other than a new instructional image 31 is present outside the visible area 41, a first notification may be performed to make the user aware of the presence of that instructional image 31.

The first notification may be outputting of prescribed sound. In this case, the CPU 11 causes the speaker 18 to output an announcement and/or a prescribed beeping sound or the like so as to inform the user that there is an instructional image 31 outside the visible area 41. Here, the announcement can be, for example, "there is an instructional image to the right". This allows the user to notice that there is an instructional image 31 that is not displayed, regardless of where the user is looking. A first notification in the form of sound may be made in conjunction with a first notification that is recognizable by the user's sight.

Figure 12:
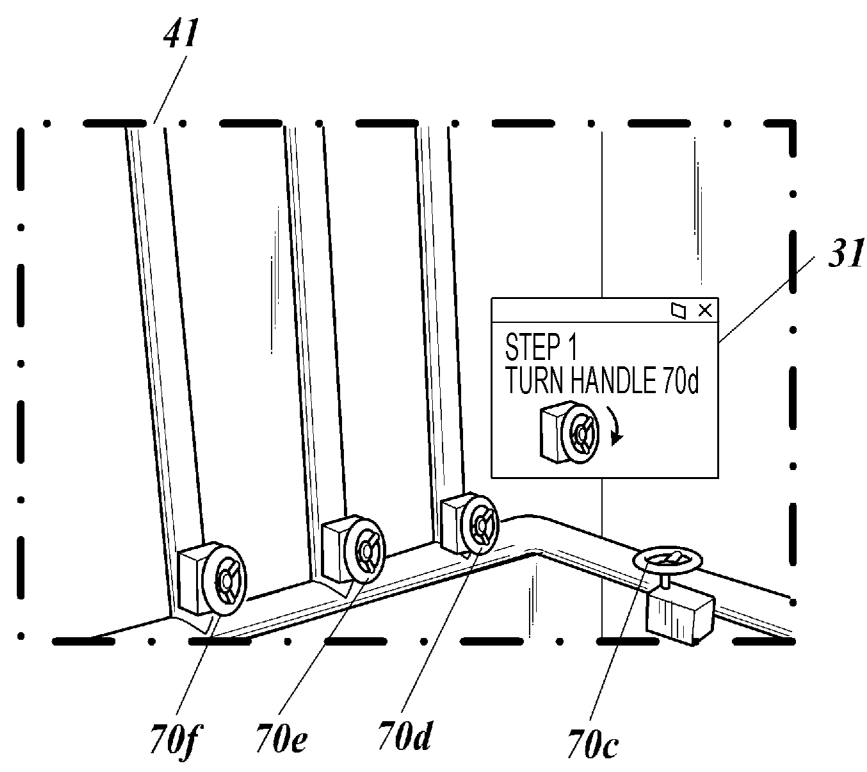
FIG. 12 is a diagram illustrating a case in which an instructional image is a document image.

Incidentally, as illustrated in FIG. 12, an instructional image 31 may be a document image. In FIG. 12, a document image relating to a manual illustrating the procedure for operating the handle 70*d*, which is a work object, is illustrated as an example. When an instructional image 31 is a document image, if the instructional image 31 overlaps a work object, the visibility of the work object will be reduced, thereby making the work more difficult. Therefore, the instructional image 31 may be displayed at a position that does not overlap the work object as seen by the user. Specifically, CPU 11 may identify the handle 70*d*, which is a work object to be worked on by the user, and determine the display position of an instructional image 31 within a range excluding a range where the instructional image 31 would visually obstruct the work object. In other words, if displaying the instructional image 31 at the display position specified by the instructional data received from the external device 20 would result in the work object being visually obstructed, the CPU 11 may change the display position of the instructional image 31 so as to not visually obstruct the work object. This reduces the occurrence of a problem where the work object is difficult to see due to the instructional image 31. The method used to identify work objects is not particularly limited, and, for example, the work objects may be identified based on results of processing performed on an image captured by the camera 154, may be identified from the content of a document image serving as an instructional image 31, or may be identified based on detection results produced by the eye tracker 155.

Instructional images 31 other than document images, for example, instructional images 31 of virtual objects such as arrows, usually, do not tend to reduce visibility even if an instructional image 31 overlaps a work object, and in some cases, giving work instructions may actually become easier when the instructional image 31 overlaps the work object. Therefore, the display positions of the instructional images 31 other than document images do not necessarily need to be adjusted in terms of their positional relationships to the work objects. However, similarly to the document images, if necessary, the display positions of the instructional images 31 may be adjusted so as to lie within a range excluding a range where the instructional images 31 would visually obstruct the work objects.

Figure 13:
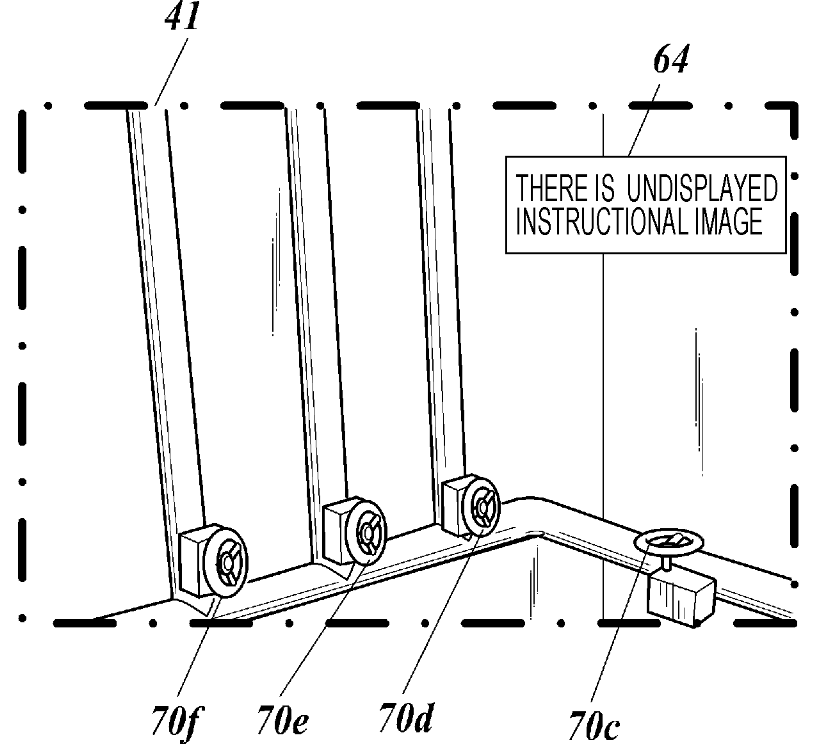
FIG. 13 is a diagram illustrating a second notification for making a user aware that an instructional image is not displayed.

The file format of a document image serving as an instructional image 31 might not be supported by the wearable terminal device 10. In other words, the document image file may be in a file format that cannot be displayed on the wearable terminal device 10. In this case, a file relating to the document image is shared between the wearable terminal device 10 and the external device 20, but the instructional image 31 of the document image is not displayed on the wearable terminal device 10. In this case, the CPU 11 may issue a second notification to inform the user that an instructional image 31 is not displayed on the display 14, as illustrated in FIG. 13. In FIG. 13, text 64 is displayed that indicates that there is an instructional image 31 that is not displayed. However, the second notification does not need to take this form, and prescribed display other than the text 64 may be displayed on the display 14, or prescribed speech may be output from the speaker 18. Issuing this second notification allows the user of the wearable terminal device 10 to recognize that there is an instructional image 31 that is not displayed contrary to the intent of the remote instructor.

Figure 14:
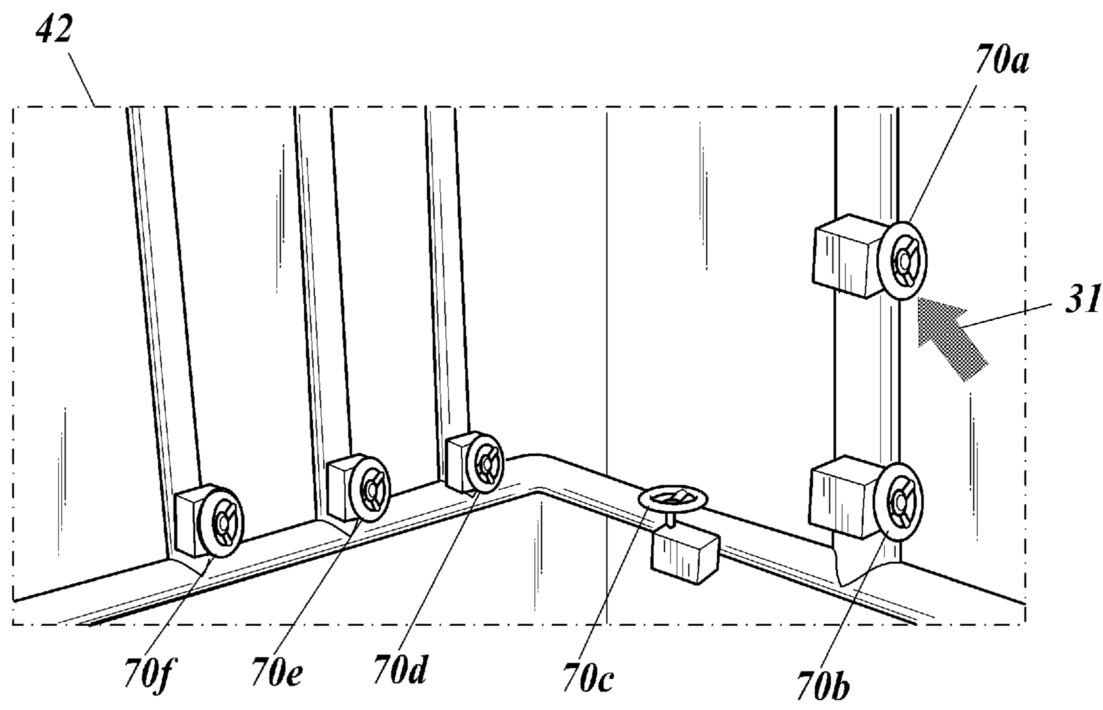
FIG. 14 is a diagram illustrating an instructional image on an instructor screen.
Figure 15:
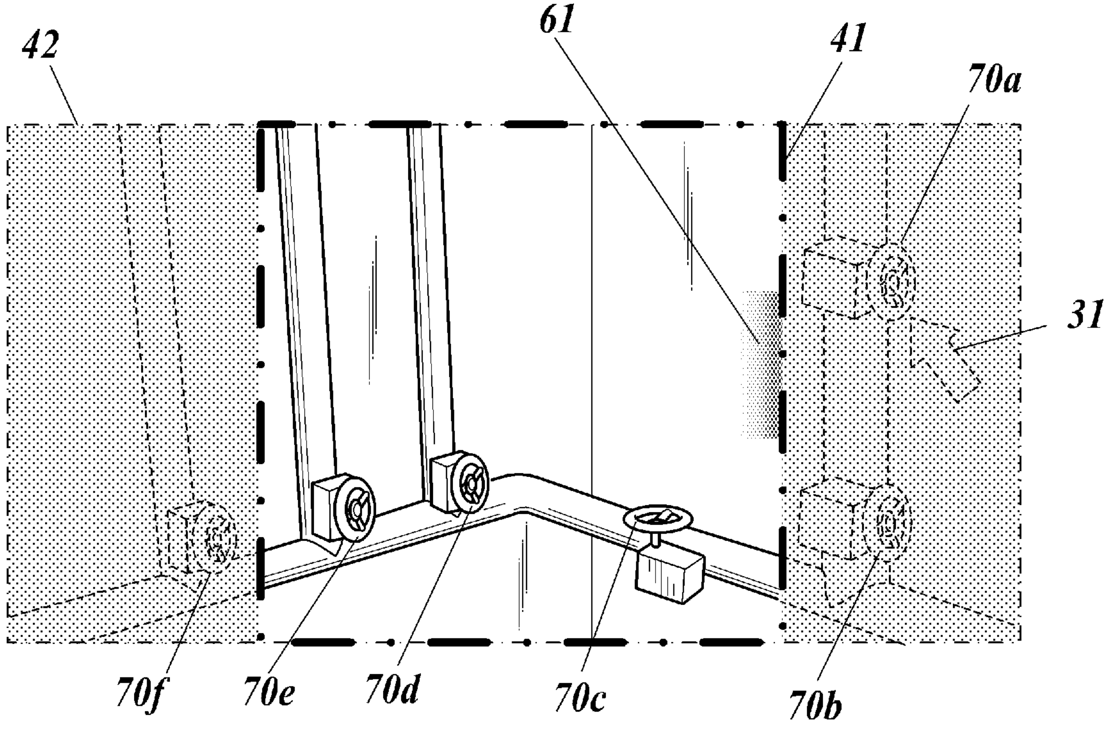
FIG. 15 is a diagram illustrating an example in which a visible area is narrower than an instructor screen.

An example is used in the above description in which the display position of an instructional image 31 is outside the visible area 41 due to the user moving or changing orientation. However, factors that result in the display position of the instructional image 31 being outside the visible area 41 are not limited to the user moving or changing orientation. For example, the visible area 41 illustrated in FIG. 15 may be smaller than the area of the instructor screen 42 illustrated in FIG. 14 (for example, all or part of the area captured by the camera 154). In this case, the display position of the instructional image 31 may be outside the visible area 41, even if the user's position and orientation do not change. In other words, if the display position of the instructional image 31 is defined within an area corresponding to the difference between the area of the instructor screen 42 and the visible area 41, the instructional image 31 will not be displayed in the visible area 41 as illustrated in FIG. 15. In this case as well, the first notification is issued in substantially the same way as described above.

Figure 16:
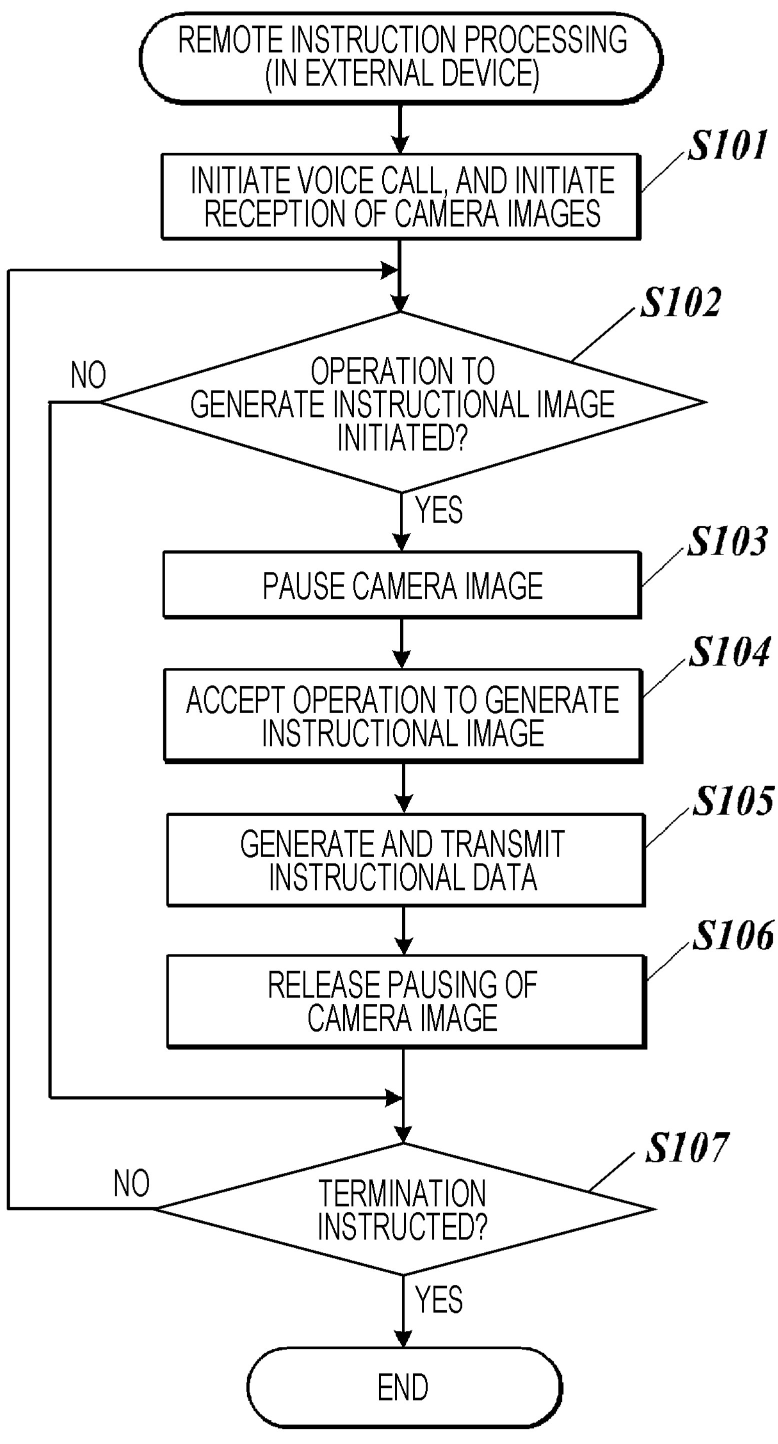
FIG. 16 is a flowchart illustrating a control procedure of remote instruction processing executed by an external device.

Next, remote instruction processing for performing the operations described above for remote instruction using the instructional images 31 will be described while referring to the flowcharts in FIGS. 16 and 17. FIG. 16 illustrates the control procedure performed by the CPU 21 of the external device 20, and FIG. 17 illustrates the control procedure performed by the CPU 11 of the wearable terminal device 10.

As illustrated in FIG. 16, when the remote instruction processing is initiated, the CPU 21 of the external device 20 initiates speech data communication with the wearable terminal device 10, thereby initiating a voice call. The CPU 21 also starts receiving camera images captured by the camera 154 of the wearable terminal device 10 (Step S101). After that, the CPU 21 displays the instructor screen 42 based on the camera images, and displays the camera images as a real-time moving image on the instructor screen 42.

The CPU 21 determines whether or not an operation to generate an instructional image 31 (hereinafter referred to as an "instructional image generation operation") has been initiated (Step S102). When the instructional image generation operation is determined to have been initiated ("YES" in Step S102), the CPU 21 pauses the camera image currently being displayed on the operation display 24 and switches to a still image (Step S103), and accepts the instructional image generation operation (Step S104). The instructional image generation operation includes, for example, an operation of specifying the type of instructional image 31 (arrow, pen input, or document image) and specifying the display position and orientation of the instructional image 31. The display position of the instructional image 31 can be specified, for example, by selecting a desired position within the paused camera image.

Once the instructional image generation operation has finished, the CPU 21 generates instructional data reflecting the content specified in the instructional image generation operation and transmits this instructional data to the wearable terminal device 10 (Step S105).

The CPU 21 releases pausing of the camera image on the instructor screen 42 and switches from a still image to a moving image (Step S106).

Once the processing of Step S106 has finished or when the instructional image generation operation is determined not to have been initiated in Step S102 (NO in Step S102), the CPU 21 determines whether or not an instruction to terminate the remote instruction processing has been issued (Step S107). If no such instruction is determined to have been issued ("NO" in Step S107), the CPU 21 returns the processing to Step S102, and if such an instruction is determined to have been issued ("YES" in Step S107"), the remote instruction processing is terminated.

As illustrated in FIG. 17, when the remote instruction processing is initiated, the CPU 11 of the wearable terminal device 10 initiates speech data communication with the external device 20, thereby initiating a voice call. The CPU 11 also initiates transmission of camera images captured by the camera 154 to the external device 20 (Step S201).

The CPU 11 determines whether or not instructional data has been received from the external device 20 (Step S202), and when instructional data is determined to have been received ("YES" in Step S202), the CPU 11 determines whether or not an instructional image 31 relating to the instructional data can be displayed (Step S203). When the instructional image 31 is a document image and the file format of the document image is of a file format that cannot be displayed on the wearable terminal device 10, the CPU 11 determines that the instructional image 31 cannot be displayed.

When the instructional image 31 is determined to be not displayable ("NO" in Step S203), the CPU 11 issues the second notification (Step S204). For example, as illustrated in FIG. 13, the CPU 11 causes the display 14 to display the text 64 indicating that there is an instructional image 31 that is not displayed.

When the instructional image 31 is determined to be displayable ("YES" in Step S203), the CPU 11 generates virtual image data 132 based on the content of the instructional data (Step S205).

When either Step S204 or Step S205 is finished, or when instructional data is determined not to have been received in Step S202 ("NO" in Step S202), the CPU 11 refers to the virtual image data 132 in the storage unit 13 and determines whether or not there is an instructional image 31 located outside the visible area 41 (Step S206). When there is determined to be an instructional image 31 located outside the visible area 41 ("YES" in Step S206), the CPU 11 issues the first notification (Step S207). For example, as illustrated in FIG. 9, the CPU 11 causes the display 14 to display the indicator 61 indicating the position of the instructional image 31 outside the visible area 41.

When Step S207 is finished or when there are determined to be no instructional images 31 located outside the visible area 41 in Step S206 ("NO" in Step S206), the CPU 11 refers to the virtual image data 132 in the storage unit 13 and determines whether or not there is an instructional image 31 located inside the visible area 41 (Step S208).

When there is determined to be an instructional image 31 located inside the visible area 41 ("YES" in Step S208), the CPU 11 determines whether or not the instructional image 31 overlaps a work object when displayed at the display position (Step S209). When the instructional image 31 is determined to overlap a work object ("YES" in Step S209), the CPU 11 adjusts the display position of the instructional image 31 in the virtual image data 132 so as to be within a range excluding a range where the instructional image 31 would visually obstruct the work object (Step S210). As described above, the processing of Step S210 may be performed only in a case when the instructional image 31 is a document image.

When Step S210 is finished or when the instructional image 31 is determined not to overlap a work object in Step S209 ("NO" in Step S209), the CPU 11 causes the instructional image 31 to be displayed at the display position specified in the virtual image data 132 (Step S211).

When Step S211 is finished or when there are determined to be no instructional images 31 located inside the visible area 41 in Step S208 ("NO" in S208), the CPU 11 determines whether or not an instruction to terminate the remote instruction processing has been issued (Step S212). If no such instruction is determined to have been issued ("NO" in Step S212), the CPU 11 returns the processing to Step S202, and if such an instruction is determined to have been issued ("YES" in Step S212"), the remote instruction processing is terminated. In FIG. 17, processing relating to the displaying of an instructional image 31 has been specifically described, but if there are virtual images 30 other than instructional images 31, processing relating to the display control of the virtual images 30 may be executed in parallel.

Second Embodiment

Next, the configuration of a display system 1 according to a Second Embodiment will be described. The Second Embodiment differs from the First Embodiment in that an external information processing apparatus 80 executes part of the processing that is executed by the CPU 11 of the wearable terminal device 10 in the First Embodiment. Hereafter, differences from the First Embodiment will be described, and description of common points will be omitted.

Figure 18:
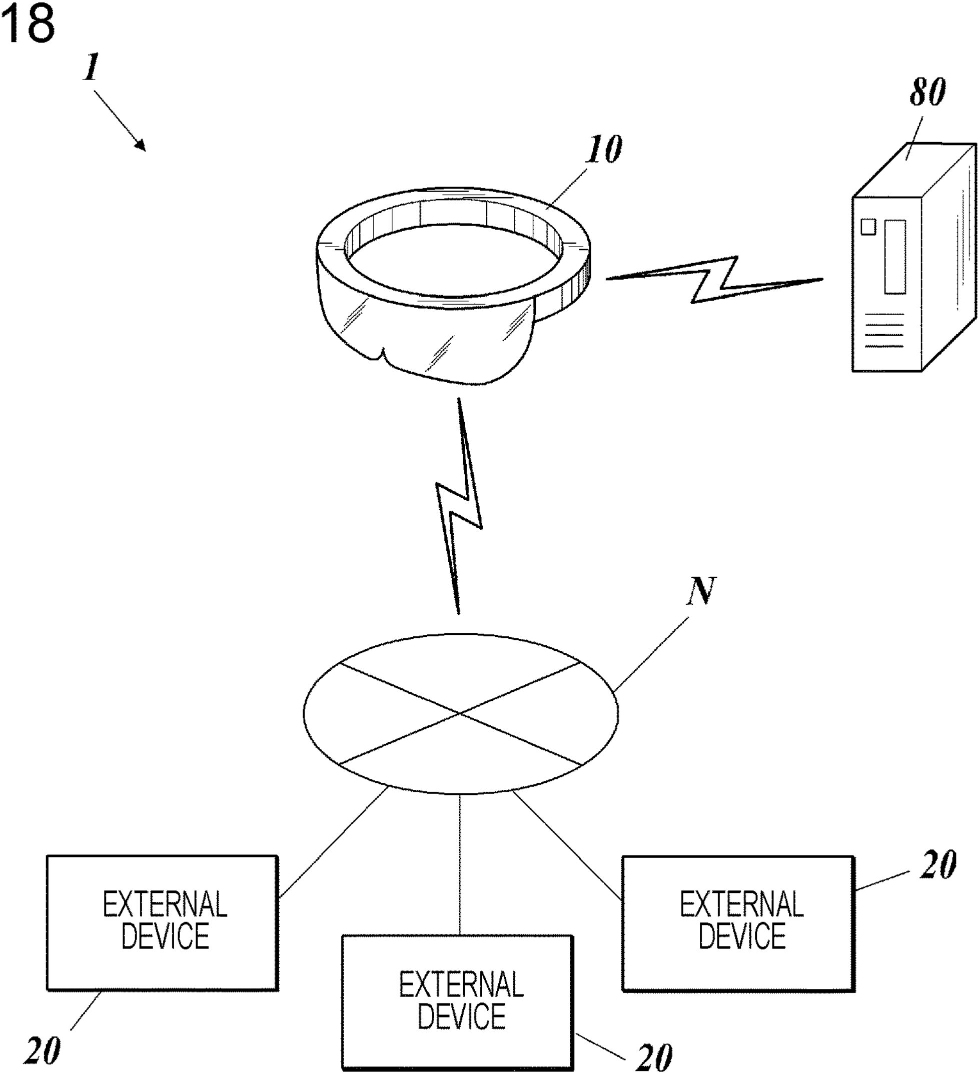
FIG. 18 is a schematic diagram illustrating the configuration of a display system according to a Second Embodiment.

As illustrated in FIG. 18, the display system 1 includes the wearable terminal device 10, multiple external devices 20, and the information processing apparatus 80 (server) connected to the wearable terminal device 10 so as to be able to communicate with the wearable terminal device 10. At least part of a communication path between the wearable terminal device 10 and the information processing apparatus 80 may be realized by wireless communication. The hardware configuration of the wearable terminal device 10 can be substantially the same as in the First Embodiment, but the processor for performing the same processing as that performed by the information processing apparatus 80 may be omitted.

Figure 19:
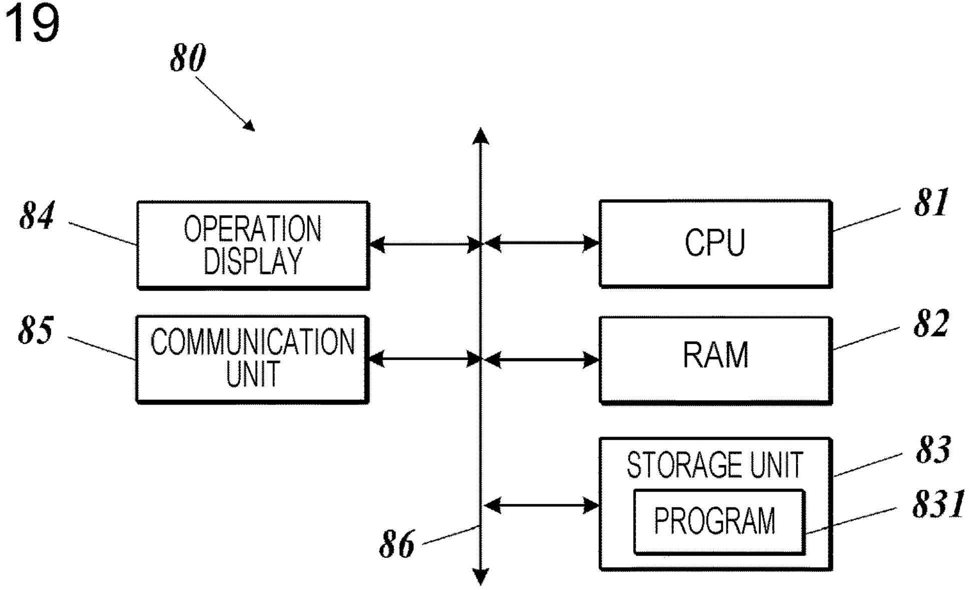
FIG. 19 is a block diagram illustrating the main functional configuration of an information processing apparatus.

As illustrated in FIG. 19, the information processing apparatus 80 includes a CPU 81, a RAM 82, a storage unit 83, an operation display 84, and a communication unit 85, which are connected to each other by a bus 86.

The CPU 81 is a processor that performs various arithmetic operations and controls overall operation of the various parts of the information processing apparatus 80. The CPU 81 reads out and executes a program 831 stored in storage unit 83 in order to perform various control operations.

The RAM 82 provides a working memory space for the CPU 81 and stores temporary data.

The storage unit 83 is a non-transitory recording medium that can be read by the CPU 81 serving as a computer. The storage unit 83 stores the program 831 executed by the CPU 81 and various settings data. The program 831 is stored in storage unit 83 in the form of computer-readable program code. For example, a nonvolatile storage device such as an SSD containing a flash memory or a HDD can be used as the storage unit 83.

The operation display 84 includes a display device such as a liquid crystal display and input devices such as a mouse and keyboard. The operation display 84 displays various information about the display system 1, such as operating status and processing results, on the display device. Here, the operating status of the display system 1 may include real-time images captured by the camera 154 of the wearable terminal device 10. The operation display 84 converts operations input to the input devices by the user into operation signals and outputs the operation signals to the CPU 81.

The communication unit 85 communicates with the wearable terminal device 10 and transmits data to and receives data from the wearable terminal device 10. For example, the communication unit 85 receives data including some or all of the detection results produced by the sensor unit 15 of the wearable terminal device 10 and information relating to user operations (gestures) detected by the wearable terminal device 10. The communication unit 85 may also be capable of communicating with devices other than the wearable terminal device 10 such as the external devices 20.

In the thus-configured display system 1, the CPU 81 of the information processing apparatus 80 performs at least part of the processing that the CPU 11 of the wearable terminal device 10 performs in the First Embodiment. For example, the CPU 81 may perform three-dimensional mapping of the space 40 based on detection results from the depth sensor 153. The CPU 81 may detect the visible area 41 for the user in the space 40 based on detection results produced by each part of the sensor unit 15. The CPU 81 may generate virtual image data 132 relating to a virtual image 30 (instructional image 31) in response to an operation performed by the user of the wearable terminal device 10 or based on instructional data received from the external device 20. The CPU 81 may also detect the position and orientation of the user's hand (and/or fingers) based on images captured by the depth sensor 153 and the camera 154.

The results of the above processing performed by the CPU 21 are transmitted to wearable terminal device 10 via the communication unit 25. The CPU 11 of the wearable terminal device 10 causes the individual parts of the wearable terminal device 10 (for example, display 14) to operate based on the received processing results. The CPU 81 may also transmit control signals to the wearable terminal device 10 in order to control display of the display 14 and/or control output of the speaker 18 of the wearable terminal device 10. For example, the CPU 81 may control the display 14 and/or speaker 18 of the wearable terminal device 10 in order to issue the first notification and/or second notification.

Thus, as a result of executing at least part of the processing in the information processing apparatus 80, the configuration of the wearable terminal device 10 can be simplified and manufacturing costs can be reduced. In addition, using the information processing apparatus 80, which has a higher performance, allows various types of processing related to MR to be made faster and more precise. Thus, the precision of 3D mapping of the space 40 can be increased, the quality of display performed by the display 14 can be improved, and the reaction speed of the display 14 to operations performed by the user can be increased.

Other Considerations

The above embodiments are illustrative examples, and may be changed in various ways.

For example, in each of the above embodiments, the visor 141 that is transparent to light was used to allow the user to see the real space, but this configuration does not necessarily need to be adopted. For example, a visor 141 that blocks light may be used and the user may be allowed to see an image of the space 40 captured by the camera 154. In other words, the CPU 11 may cause the display 14 to display an image of the space 40 captured by the camera 154 and the virtual images 30 superimposed on the image of the space 40. With this configuration, MR, in which the virtual images 30 are merged with the real space, can be realized.

In addition, VR can be realized in which the user is made to feel as though he or she is in a virtual space by using images of a pre-generated virtual space instead of images captured in the real space by the camera 154. In this VR as well, the visible area 41 for the user is identified, and the part of the virtual space that is inside the visible area 41 and the virtual images 30 whose display positions are defined as being inside the visible area 41 are displayed. Therefore, similarly to as in each of the above embodiments, the first notification and so on can be used when there is an instructional image 31 located outside of the visible area 41.

The wearable terminal device 10 does not need to include the ring-shaped body **10*a* illustrated in FIG. 1, and may have any structure so long as the wearable terminal device 10 includes a display that is visible to the user when worn. For example, a configuration in which the entire head is covered, such as a helmet, may be adopted. The wearable terminal device 10** may also include a frame that hangs over the ears, like a pair of glasses, with various devices built into the frame.

The virtual images 30 do not necessarily need to be stationary in the space 40 and may instead move within the space 40 along prescribed paths.

An example has been described in which the gestures of a user are detected and accepted as input operations, but the present disclosure is not limited to this example. For example, input operations may be accepted by a controller held in the user's hand or worn on the user's body.

The present disclosure has been described using an example in which display instruction is performed using an instructional image 31 from the external device 20 to the wearable terminal device 10 during the execution of a voice call via speech data communication. However, not limited to this example, display instruction may be performed using an instructional image 31 without involving speech data communication.

Although an example of a voice call between the wearable terminal device 10 and the external device 20 is used in the description, a voice call does not need to be used and a video call may also be possible. In this case, a webcam capturing images of a remote operator can be installed in the external device 20, and image data captured by the webcam can be transmitted to the wearable terminal device 10 and displayed on the display 14.

The instructional images 31 are not limited to those displayed for providing work instructions to the user of the wearable terminal device 10. The instructional images 31 include any virtual images 30 that are displayed on the wearable terminal device 10 based on the instructions of an instructor (including the user himself/herself) for the purpose of being made visible to the user of the wearable terminal device 10.

Other specific details of the configurations and control operations described in the above embodiments can be changed as appropriate without departing from the intent of the present disclosure. The configurations and control operations described in the above embodiments can be combined as appropriate to the extent that the resulting combinations do not depart from the intent of the present disclosure.

INDUSTRIAL APPLICABILITY

The present disclosure can be used in wearable terminal devices, programs, and notification methods.

REFERENCE SIGNS

1 display system
10 wearable terminal device
10*a* body
11 CPU (processor)
12 RAM
13 storage unit
131 program
132 virtual image data
14 display
141 visor (display member)
142 laser scanner
15 sensor unit
151 acceleration sensor
152 angular velocity sensor
153 depth sensor
154 camera
155 eye tracker
16 communication unit
17 microphone
18 speaker
19 bus
20 external device
21 CPU
22 RAM
23 storage unit
231 program
24 operation display
25 communication unit
26 bus
30 virtual image
301 function bar
302 window shape change button
303 close button
31 instructional image
40 space
41 visible area
42 instructor screen
51 virtual line
52 pointer
61 indicator
62, 64 text
63 sign
70*a* to 70*f* handle (work object)
80 information processing apparatus
81 CPU
82 RAM
83 storage unit
831 program
84 operation display
85 communication unit
86 bus
N network
U user.

The invention claimed is:

1. A wearable terminal device configured to be used by being worn by a user, the wearable terminal device comprising:

a transparent display through which the user views a real space;

a camera configured to capture a real-time moving image of the real space viewed by the user; and at least one processor, wherein the at least one processor is configured to:

transmit the real-time moving image to an external device configured to display the real-time moving image, receive, from the external device based on a selected position within a still image of the real-time moving image, a command to display an instructional image on the transparent display at a position in the real space corresponding to the selected position in the still image;

detect a visible area of the real space viewed by the user through the transparent display, determine that the position in the real space is outside the visible area, and display a notification image on a periphery of the transparent display, a position of the periphery at which the notification image is disposed indicating a direction in which the instructional image is located in the real space, the notification image indicating existence of the instructional image outside of the visible area, wherein in response to determining that a plurality of instructional images are located outside the visible area, the at least one processor is configured to control the transparent display to display a corresponding plurality of notification images on the periphery of the transparent display, wherein each of the plurality of notification images corresponds to a respective one of the plurality of instructional images, and a position of each notification image on the periphery indicates a direction of the corresponding instructional image.

2. The wearable terminal device according to claim 1, wherein the at least one processor is configured to display the instructional image on a display surface of the transparent display with the instructional image visible in the real space that is visible through the transparent display.

3. The wearable terminal device according to claim 1, wherein the at least one processor causes the transparent display to display an image of the real space captured by the camera and the instructional image superimposed on the image of the real space.

4. The wearable terminal device according to claim 1, further comprising:

a communication unit configured to communicate data with an external device used by a remote instructor, wherein the at least one processor is configured to generate the instructional image based on instructional data received by the communication unit from the external device, and control the transparent display to display the instructional image.

5. The wearable terminal device according to claim 4, wherein the communication unit is configured to perform speech data communication with the external device, and the at least one processor is configured to control the transparent display to display the instructional image during the speech data communication via the communication unit.

6. The wearable terminal device according to claim 4, wherein during a condition in which the instructional image cannot be displayed based on the instructional data, the at least one processor is configured to control the transparent display to display a second notification making the user aware that the instructional image is not displayed on the transparent display.

7. The wearable terminal device according to claim 1, wherein the at least one processor is configured to control the transparent display to display the notification image being visually recognizable by the user.

8. The wearable terminal device according to claim 7, wherein the notification image is a prescribed notification display performed by the transparent display.

9. The wearable terminal device according to claim 1, wherein the notification image includes an output of prescribed sound.

10. The wearable terminal device according to claim 1, wherein the at least one processor is configured to identify a work object to be worked on by the user, and determine a display position of the instructional image within a range excluding a range where the instructional image would visually obstruct the work object.

11. The wearable terminal device according to claim 1, wherein the instructional image is a document image of a prescribed format.

12. The wearable terminal device according to claim 1, wherein the instructional image is an image of a virtual object.

13. The wearable terminal device according to claim 12, wherein the virtual object is an object representing a path traced by pen input.

14. The wearable terminal device according to claim 1, wherein the at least one processor is configured to control the transparent display to display the notification image in a first manner in response to determining that the instructional image not been displayed on the transparent display before and in a second manner in response to determining that the instructional image has been displayed on the transparent display before.

15. The wearable terminal device according to claim 1, wherein the at least one processor is configured to control the transparent display to display the notification image in a first manner in response to determining that a time elapsed since the command was received is less than or equal to a prescribed reference time and in a second manner in response to determining that the time elapsed since the command was received is greater than the prescribed reference time.

16. A notification method for use in a wearable terminal device configured to be used by being worn by a user, the notification method comprising:

capturing a real-time moving image of a real space viewed by the user through a transparent display of the wearable terminal device;

transmitting the real-time moving image to an external device configured to display the real-time moving image;

receiving, from the external device based on a selected position within a still image of the real-time moving image, a command to display an instructional image on the transparent display at a position in the real space corresponding to the selected position in the still image;

detecting a visible area of the real space viewed by the user through the transparent display;

determining that the position in the real space is outside the visible area;

displaying a notification image on a periphery of the transparent display, a position of the periphery at which the notification image is disposed indicating a direction in which the instructional image is located in the real space, the notification image indicating existence of the instructional image outside of the visible area; and in response to determining that a plurality of instructional images are located outside the visible area, displaying a corresponding plurality of notification images on the periphery of the transparent display, wherein each of the plurality of notification images corresponds to a respective one of the plurality of instructional images, and a position of each notification image on the periphery indicates a direction of the corresponding instructional image.

* * * * *